US011930524B2

(12) United States Patent
Wu et al.

(10) Patent No.: US 11,930,524 B2
(45) Date of Patent: Mar. 12, 2024

(54) TECHNIQUES FOR INTER-UE COORDINATION PRIORITIZATION FOR COLLISION INDICATION

(71) Applicant: QUALCOMM Incorporated, San Diego, CA (US)

(72) Inventors: Shuanshuan Wu, San Diego, CA (US); Tien Viet Nguyen, Bridgewater, NJ (US); Gabi Sarkis, San Diego, CA (US); Kapil Gulati, Belle Mead, NJ (US); Sourjya Dutta, San Diego, CA (US); Hui Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 17/807,674

(22) Filed: Jun. 17, 2022

(65) Prior Publication Data
US 2023/0043000 A1    Feb. 9, 2023

Related U.S. Application Data

(63) Continuation of application No. PCT/CN2021/106986, filed on Jul. 19, 2021.

(51) Int. Cl.
*H04W 72/40* (2023.01)
*H04L 5/16* (2006.01)
(Continued)

(52) U.S. Cl.
CPC .............. *H04W 72/569* (2023.01); *H04L 5/16* (2013.01); *H04W 72/0446* (2013.01);
(Continued)

(58) Field of Classification Search
CPC .............. H04L 67/104; H04L 67/1091; H04L 29/08306; H04W 28/0875; H04W 72/25; H04W 72/40
See application file for complete search history.

(56) References Cited

U.S. PATENT DOCUMENTS

2018/0035448 A1* 2/2018 Gupta .................. H04W 72/23
2021/0400681 A1* 12/2021 Wang ................... H04L 5/0044
(Continued)

OTHER PUBLICATIONS

R1-2104927, "Considerations on Inter-UE Coordination Schemes for Mode 2 Enhancements", May 10-27, 2021, pp. 1-20 (Year: 2021).*
(Continued)

*Primary Examiner* — Salvador E Rivas
(74) *Attorney, Agent, or Firm* — Dalei Dong; Holland & Hart LLP

(57) ABSTRACT

Methods, systems, and devices for wireless communications are described. An example method for wireless communication at a first user equipment (UE) may include receiving at least a first sidelink transmission from a second UE, wherein at least a second sidelink transmission from a third UE is scheduled contemporaneously with at least the first sidelink transmission from the second UE. The method may also include transmitting an indication in a transmission occasion to at least one of the second UE or the third UE based at least in part on a prioritization of information for the transmission occasion, wherein the indication indicates that at least the first sidelink transmission from the second UE is scheduled contemporaneously with at least the second sidelink transmission from at least the third UE.

29 Claims, 12 Drawing Sheets

(51) Int. Cl.
H04W 72/0446 (2023.01)
H04W 72/1263 (2023.01)
H04W 72/25 (2023.01)
H04W 72/566 (2023.01)
H04W 92/18 (2009.01)

(52) U.S. Cl.
CPC ....... H04W 72/1263 (2013.01); H04W 72/25 (2023.01); H04W 72/40 (2023.01); *H04W 92/18* (2013.01)

(56) References Cited

U.S. PATENT DOCUMENTS

2022/0201698 A1* 6/2022 Hahn .................... H04W 84/20
2022/0225160 A1* 7/2022 Sarkis ............... H04W 28/0284

OTHER PUBLICATIONS

R1-2104927, "Inter-UE Coordination Schemes for Sidelink Communication", May 10-27, 2021, pp. 1-18 (Year: 2021).*

R1-2105067, "Considerations on Inter-UE Coordination Schemes for Mode 2 Enhancements", May 10-27, 2021, pp. 1-20 (Year: 2021).*

Fujitsu: "Considerations on Inter-UE Coordination for Mode 2 Enhancements", 3GPP Draft, 3GPP TSG RAN WG1 Meeting #105-e, R1-2105067, 3rd Generation Partnership Project (3GPP), Mobile Competence Centre, 650, Route Des Lucioles, F-06921 Sophia-Antipolis Cedex, France, vol. RAN WG1, No. a-Meeting, May 10, 2021-May 27, 2021, May 11, 2021 (May 11, 2021), XP052006312, 20 Pages, Retrieved from the Internet: URL: https://ftp.3gpp.org/tsg_ran/WG11/TSGR1_105-e/Docs/R1-2105067.zip R1-2105067 Considerations on Inter-UE Coordination for Mode 2 Enhancements.docx [Retrieved on May 11, 2021] section 2.2.1-section 2.2.3.

Intel Corporation: "Inter-UE Coordination Schemes for Sidelink Communication", 3GPP Draft, 3GPP TSG RAN WG1 #105-e, R1-2104927, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021, (May 12, 2021), XP052011145, 18 Pages, Retrieved from the Internet: URL: https://ftp.3gpp.org/tsg_ran/WG1_RL1/TSGR1_105-e/Docs/R1-2104927.zip R1-2104-927 - Intel - eV2X M2RA.docx [Retrieved on May 12, 2021] section 1 section 2.2 section 2.2.2 section 2.6.2 section 2.7.2.

International Search Report and Written Opinion—PCT/CN2021/106986—ISA/EPO—dated Jan. 28, 2022.

Lenovo., et al., "Discussion on Inter-UE Coordination for Mode 2 Enhancements", 3GPP Draft, 3GPP TSG RAN WG1 #105-e, R1-2104870, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021 (May 12, 2021), XP052011091, 9 Pages, Retrieved from the Internet: URL: https://ftp.3gpp.org/tsg_ran/WG1_RL1/TSGR1_105-e/Docs/R1-2104870.zip R1-2104870.docx [Retrieved on May 12, 2021] Section 2.2.

* cited by examiner

TECHNIQUES FOR INTER-UE COORDINATION PRIORITIZATION FOR COLLISION INDICATION

CROSS REFERENCE

The present application for patent is a Continuation of PCT Application No. PCT/CN2021/106986 by WU et al., entitled "TECHNIQUES FOR INTER-UE COORDINATION PRIORITZATION FOR COLLISION INDICATION" filed Jul. 19, 2021, assigned to the assignee hereof, and expressly incorporated by reference in its entirety herein.

FIELD OF DISCLOSURE

The following relates to wireless communications, including techniques for inter-UE coordination prioritization for collision indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a user equipment (UE) may communicate with another UE via a sidelink communications link. For example, a first UE may transmit sidelink transmissions to a second UE. In some implementations, the second UE may be configured to contemporaneously transmit sidelink transmissions to the first UE or to another UE. Techniques for coordinating sidelink transmissions may be improved.

SUMMARY

The described techniques relate to improved methods, systems, devices, and apparatuses that support techniques for inter-UE coordination prioritization for collision indication. Generally, the described techniques provide for improved methods of informing one or more UEs of conflicts between multiple different sidelink transmissions in the same set of channel resources (e.g., time resources, frequency resources, code resources, etc.).

A third-party UE may identify resources associated with sidelink transmissions of two or more other UEs over a sidelink shared channel. For example, a first UE may reserve, via a sidelink control information (SCI) transmission, a set of sidelink communication resources for a first sidelink transmission (e.g., a physical sidelink shared channel (PSSCH) transmission) by the first UE. The third-party UE may identify a sidelink transmission collision involving a first sidelink transmission associated with the first UE and a second sidelink transmission associated with a second UE. The sidelink transmission conflict may arise from the first sidelink transmission and the second sidelink transmission sharing the same channel resources. In some cases, the third-party UE may identify the conflict before a collision occurs, or after. Accordingly, based on detecting the conflict (e.g., a collision or potential collision), the third-party UE may send a conflict indication to one or more of the UEs involved in the conflict. The third-party UE may transmit the conflict indication in a transmission occasion, which may be associated with a transmission occasion for feedback messages.

However, the third-party UE may have limited capacity in the transmission occasion to indicate one or more conflicts, and may have to chose what to include in the transmission occasion. The UE may prioritize between including the UE's own HARQ feedback and conflict indications or between other transmissions of the UE and conflict indications. For example, the UE may have a data packet to transmit in a slot and it may also have a conflict indication to transmit in the same slot. If the UE is unable to transmit both the data packet and the conflict indication simultaneously, the UE may have to determine which one to transmit based on a prioritization. As another example, the UE may have to prioritize hybrid automatic repeat request (HARQ) acknowledgements (ACKs) and negative acknowledgements (NACKs) and conflict indications.

Techniques described herein provide the third-party UE with prioritization schemes for selecting which feedback and conflict indications to include in the transmission occasion. If there are more feedback messages than the third-party UE can send in the transmission occasion, the third-party UE may have to drop some of its regular feedback messages or some of the conflict indications. The third-party UE may apply configured or pre-configured prioritization to select which regular feedback messages and conflict indication messages to include in the transmission occasion. In some examples, feedback messages are always prioritized over conflict indications. In some examples, the conflict indications are prioritized by type of conflict. In some examples, feedback messages are prioritized the same as a first type of conflict indication.

A method for wireless communication at a first UE is described. The method may include receiving at least a first sidelink transmission from a second UE, where at least a second sidelink transmission from a third UE is scheduled contemporaneously with at least the first sidelink transmission from the second UE and transmitting an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE.

An apparatus for wireless communication at a first UE is described. The apparatus may include a processor, memory coupled with the processor, and instructions stored in the memory. The instructions may be executable by the processor to cause the apparatus to receive at least a first sidelink transmission from a second UE, where at least a second sidelink transmission from a third UE is scheduled contemporaneously with at least the first sidelink transmission from the second UE and transmit an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE.

Another apparatus for wireless communication at a first UE is described. The apparatus may include means for receiving at least a first sidelink transmission from a second UE, where at least a second sidelink transmission from a third UE is scheduled contemporaneously with at least the first sidelink transmission from the second UE and means for transmitting an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE.

A non-transitory computer-readable medium storing code for wireless communication at a first UE is described. The code may include instructions executable by a processor to receive at least a first sidelink transmission from a second UE, where at least a second sidelink transmission from a third UE is scheduled contemporaneously with at least the first sidelink transmission from the second UE and transmit an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE.

Some examples of the method, apparatuses, and non-transitory computer-readable medium described herein may further include operations, features, means, or instructions for determining a type of conflict between the second UE and the third UE, where the prioritization of the information may be based on the type of conflict.

In some examples of the method, apparatuses, and non-transitory computer-readable medium described herein, the prioritization of information prioritizes conflict indications of the type of conflict over first UE feedback messages.

In some examples of the method, apparatuses, and non-transitory computer-readable medium described herein, the type of conflict includes a direct collision of at least the first sidelink transmission from the second UE transmitted over a first resource with at least the second sidelink transmission from the third UE over the first resource, a half-duplex collision of at least the first sidelink transmission from the second UE transmitted in a slot with at least the second sidelink transmission from the third UE transmitted in the slot, or an in-band collision of at least the first sidelink transmission from the second UE transmitted over a first frequency with at least the second sidelink transmission from the third UE over a second frequency adjacent to the first frequency.

In some examples of the method, apparatuses, and non-transitory computer-readable medium described herein, the prioritization includes a first priority level for the direct collision, a second priority level lower than the first priority level for the half-duplex collision, and a third priority level lower than the second priority level to for the in-band collision.

In some examples of the method, apparatuses, and non-transitory computer-readable medium described herein, the prioritization further including a fourth priority level for first UE feedback messages, and the fourth priority level may be higher than the first priority level.

In some examples of the method, apparatuses, and non-transitory computer-readable medium described herein, the prioritization further including the first priority level for first UE feedback messages.

In some examples of the method, apparatuses, and non-transitory computer-readable medium described herein, the indication may be a first conflict indication, and the information further includes at least one first UE feedback message and at least a second conflict indication.

Some examples of the method, apparatuses, and non-transitory computer-readable medium described herein may further include operations, features, means, or instructions for detecting a set of multiple conflicts associated with the transmission occasion, determining a set of multiple first UE feedback messages associated with the transmission occasion, determining a maximum number of feedback messages that may be sent in the transmission occasion, selecting a subset of first UE feedback messages from the set of multiple first UE feedback messages based on the prioritization, and selecting a subset of a set of multiple indications for the set of multiple conflicts based on the prioritization, where transmitting the indication in the transmission occasion further includes transmitting the subset of the set of multiple indications and the subset of first UE feedback messages in the transmission occasion.

In some examples of the method, apparatuses, and non-transitory computer-readable medium described herein, the indication may be associated with a first conflict of a first conflict type and the method, apparatuses, and non-transitory computer-readable medium may include further operations, features, means, or instructions for identifying at least a second conflict of the first conflict type and selecting the first conflict over at least the second conflict to indicate in the indication based on a data transmission prioritization.

In some examples of the method, apparatuses, and non-transitory computer-readable medium described herein, the indication may be associated with a first conflict of a first conflict type and the method, apparatuses, and non-transitory computer-readable medium may include further operations, features, means, or instructions for identifying at least a second conflict of the first conflict type and selecting the first conflict over at least the second conflict to indicate in the indication based on a ranking of the first conflict and at least the second conflict.

In some examples of the method, apparatuses, and non-transitory computer-readable medium described herein, the first sidelink transmission may be received via a first resource, and the second sidelink transmission may be scheduled for transmission with the first resource.

Some examples of the method, apparatuses, and non-transitory computer-readable medium described herein may further include operations, features, means, or instructions for receiving the second sidelink transmission from the third UE via the first resource, where the indication may be based on receiving the first sidelink transmission and the second sidelink transmission.

DETAILED DESCRIPTION

Figure 1:
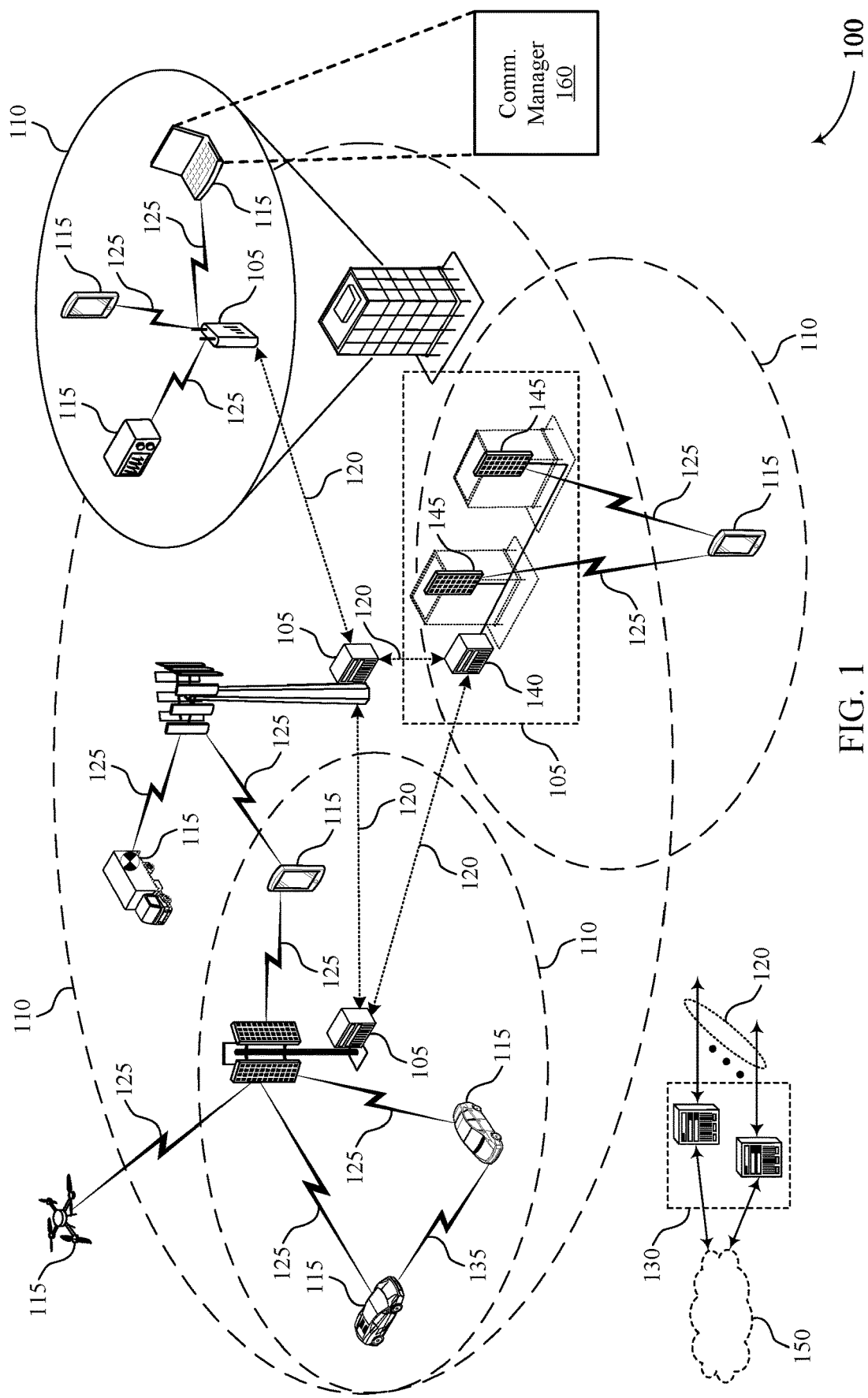
FIG. 1 illustrates an example of a wireless communications system that supports techniques for inter-UE coordination prioritization for collision indication in accordance with various aspects of the present disclosure.

In sidelink communications, two or more UEs may have a scheduling conflict with each other. The conflict could include, for example, a direct collision where a first UE transmits on a same resource as a second UE or a half-duplex collision where the first UE and the second UE both transmit in the same slot. Another conflict type includes an in-band emission collision where the transmissions of the first UE and the second UE are in adjacent frequencies and cause interference. As a result, these two UEs cannot receive each others' transmissions and cannot detect the conflict. However, a third-party UE may be able to detect the conflict and inform either one or both of the first UE and the second UE of the conflict. The third-party UE may send a conflict indication in a regular feedback message occasion to either the first UE or the second UE. However, sometime the third-party UE may not have enough available capacity in its transmission occasion associated with providing feedback to indicate all of the conflicts it may detect.

Techniques described herein prioritize which regular feedback messages (e.g., HARQ ACK/NACKs) and which conflict indications to send when the capacity of the transmission occasion (e.g., the number of feedback messages plus conflict indications) is limited. For each transmission occasion for feedback, the third-party UE may have its own regular feedback messages that it needs to send in addition to the conflict indications. During the time period associated with the transmission occasion, the third-party UE may detect one or more conflicts between different UEs, such as the first UE and the second UE. If there are more feedback messages than the third-party UE can send in the transmission occasion, the third-party UE may have to drop some of its regular feedback messages or some of the conflict indication messages. The third-party UE may apply configured or pre-configured prioritization to select which regular feedback messages and conflict indication to include in the transmission occasion.

Different prioritization schemes are described herein. For example, the conflict indications may be prioritized by type of conflict. For example, a direct collision may be prioritized over a half-duplex collision and the half-duplex collision may be prioritized over an in-band collisions. In some examples, regular feedback messages may be prioritized over conflict indications. In other examples, conflict indications for some conflict types may be prioritized over the regular feedback messages. In some examples, conflict indications for some conflict types may be prioritized the same as regular feedback messages. For conflicts with the same priority level as each other or with the same priority as some regular feedback messages, a further prioritization can be based on the transmission itself (e.g., the data in the transmission, which may be indicated in SCI). In another example, conflict indications for conflicts of the same type may have the same priority level. If there are more conflict indications with the same conflict type than can be included in the transmission occasion, a subset of conflict indications from that conflict type may be randomly selected.

Aspects of the disclosure are initially described in the context of wireless communications systems. Aspects of the disclosure are further illustrated by and described with reference to a process flow and block diagrams. Aspects of the disclosure are further illustrated by and described with reference to apparatus diagrams, system diagrams, and flowcharts that relate to techniques for inter-UE coordination prioritization for collision indication.

FIG. 1 illustrates an example of a wireless communications system 100 that supports techniques for inter-UE coordination prioritization for collision indication in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), unlicensed radio frequency spectrum band radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UE 115 may include a communications manager 160, which may support inter-UE coordination prioritization for collision indication. The communications manager 160 may receive at least a first sidelink transmission from a second UE, wherein at least a second sidelink transmission from a third UE is scheduled contemporaneously with at least the first sidelink transmission from the second UE. The communications manager 160 may transmit an indication in a transmission occasion to at least one of the second UE or the third UE based at least in part on a prioritization of information for the transmission occasion, wherein the indication indicates that at least the first sidelink transmission from the second UE is scheduled contemporaneously with at least the second sidelink transmission from at least the third UE.

The techniques described herein enable a UE that has resources scheduled for sidelink transmissions to become aware of possible conflicts with sidelink transmissions from another UE. The third-party UE may detect the conflict and send an indication to one or more of the UEs involved in the conflict. The techniques described herein improve network efficiency through more efficient utilization of communication resources, reduce interference, reduce retransmissions, reduce power consumption leading to a longer battery life due to less retransmissions, and improve user experience. The described techniques may also improve communication reliability, improve coordination between devices, and reduce latency.

Figure 2:
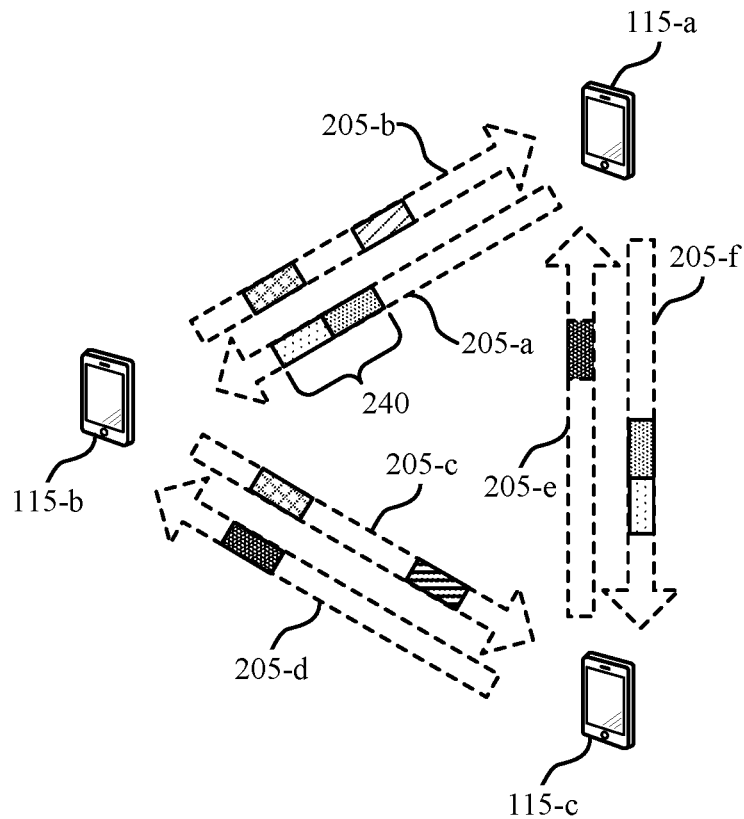
FIG. 2 illustrates an example of a wireless communications system that supports techniques for inter-UE coordination prioritization for collision indication in accordance with various aspects of the present disclosure.

FIG. 2 illustrates an example of a wireless communications system 200 that supports techniques for inter-UE coordination prioritization for collision indication in accordance with various aspects of the present disclosure. The wireless communications system 200 may include a first UE 115-a, a second UE 115-b, and a third UE 115-c that may be examples of one or more aspects of a UE 115 as described herein. As described with respect to the example of FIG. 2, the first UE 115-a, the second UE 115-b, and the third UE 115-c may be collectively referred to as UEs 115. UEs 115 may each be served by a base station, where the UEs 115 may be served by the same base station or different base stations. In some cases, UEs 115-a, 115-b, 115-c, or a combination thereof may implement a inter-UE coordination prioritization for collision indications. Additionally, or alternatively, other wireless devices, such as a base station, or some combination of UEs 115 and base stations, may implement inter-UE coordination prioritization for collision indications.

In some wireless communications systems, such as wireless communications system 200, a UE 115 may communicate with one or more other UEs 115 via sidelink communication links 205, such as sidelink communication links 205-a through 205-f. For example, the second UE 115-b may transmit coordination information 215 via sidelink communications link 205-c (e.g., via a sidelink control channel signal, such as a physical sidelink control channel (PSCCH)) to the third UE 115-c. In some examples, the second UE 115-b may also transmit coordination information via sidelink communications link 205-b (e.g., via a sidelink control channel signal, such as PSCCH) to the first UE 115-a. The UEs 115 may be intended to communicate with the other UEs 115 or may even be communicating with different UEs, but the UEs 115 may receive some or all of the sidelink transmissions.

The coordination information 215 may include sidelink control information (SCI) (e.g., a first-stage SCI), that may indicate information (e.g., time resource, frequency resources, MCS, etc.) associated with a subsequent first sidelink transmission 220 (e.g., via a physical sidelink shared channel (PSSCH)). The coordination information 215 may include, for example, information indicating one or more preferred resources for sidelink transmissions of another UE 115, information indicating one or more non-preferred resources for sidelink transmissions of the UE 115, or information indicating a collision. In some examples, each of the UEs 115 may send coordination information to any other of the UEs 115.

For example, the second UE 115-b may generate and share coordination information with the third UE 115-c. The coordination information may include one or more of an indication of a preferred resource for sidelink transmissions of the third UE 115-c, an indication of a non-preferred resource for sidelink transmissions of the third UE 115-c, or information that indicates a conflict or collision.

In some examples, inter-UE coordination may be categorized into at least two different schemes. In a first scheme, the coordination information sent from the first UE 115-a to the second UE 115-b may be a set of resources preferred or not preferred for transmissions of the second UE 115-b. That is, the coordination information may indicate a preferred or non-preferred resource for the transmissions of another UE 115. In some examples, a full frequency scan (FFS) at the UE 115 may include a possibility of down-selection between the preferred resource set and the non-preferred resource set and whether to include any additional information in the coordination information other than indicating the time and frequency of the resources within the set.

In a second scheme, the coordination information sent from the first UE 115-a to the second UE 115-b may indicate the presence of expected, potential, or detected resource conflicts on the resources indicated by SCI of the second UE 115-b. FFS may include a possibility of down-selection between the expected or potential conflict and the detected resource conflict.

A recipient of coordination information may use the information to receive and decode one or more sidelink transmissions. For example, upon receiving the coordination information 215, the third UE 115-c may identify the information included in the SCI to receive and decode a first sidelink transmission 220 from the second UE 115-b. The third UE 115-c may or may not be the target recipient of the first sidelink transmission 220.

Similarly, the third UE 115-c may transmit a second sidelink transmission 225 (e.g., via a PSSCH) to, or at least in the direction of, the second UE 115-b. However, in some examples, the first sidelink transmission 220 and the second sidelink transmission 225 may conflict in time or frequency resources. That is, the first sidelink transmission 220 and the second sidelink transmission 225 may have a conflict. As used herein, a conflict may include a contemporaneous scheduling of transmissions. A conflict may also be overlapping transmissions of two or more UEs 115. In a conflict, the transmissions may or may not collide.

Conflicts may arise because each UE 115 may perform its own resource allocation for sidelink transmissions. In some examples, one or more of the UEs 115 may not coordinate with any other UEs 115 for resource allocation. In other examples, one or more of the UEs 115 may coordinate with some of the other, proximate UEs 115 for resource allocation. However, because each UE 115 may perform its own resource allocation, there may be conflicts or collisions with sidelink transmissions of another UE 115.

A first type of conflict may be a direct conflict (e.g., a type-1 conflict). In a direct conflict, two or more UEs are transmitting on the same or overlapping resources. For example, the second UE 115-b and the third UE 115-c may transmit on the same or overlapping resources.

A second type of conflict may be a half-duplex conflict (e.g., a type-2 conflict). A UE 115 being half-duplex means that when the UE 115 is transmitting, it cannot simultaneously receive, and vice-versa. Likewise, a half-duplex UE 115 may not be able to transmit while it is receiving. In an example of a half-duplex conflict, the second UE 115-b and the third UE 115-c may transmit in the same slot, resulting in neither UE 115 being able to receive the transmission from the other UE 115 due to half duplex constraints.

A third type of conflict may be an in-band emission conflict (e.g., a type-3 conflict). In an in-band emission conflict, two or more UEs 115 are transmitting in adjacent frequencies, and when the received signal powers for the two or more transmissions are significantly different for reception, the leakage from higher power signal may interfere with the lower power signal.

When a UE 115 is subject to a half-duplex constraint, the UE 115 may have to prioritize some operations over others if there are multiple operations ongoing. For example, if the UE 115 is transmitting, it is not able to receive, so the UE 115 may need to decide if it should be transmitting or receiving. In some examples, the decision about whether to receive or transmit may be based on a priority of a transmission. The priority may be indicated in an SCI and the UE 115 may obtain it from higher layers.

To improve sidelink transmission coordination, one or more devices (e.g., such as one or more of the UEs 115) may be configured to detect sidelink transmission conflicts before or after the conflicts occur. For example, one of the UEs 115 may inform the other UEs 115 of a conflict. In the example of FIG. 2, the first UE 115-a may function as a third-party UE 115-a, and may receive or otherwise observe transmissions from the second UE 115-b and the third UE 115-c. For example, the first UE 115-a may receive one or both of the first sidelink transmission 220 and the second sidelink transmission 225. The first UE 115-a may be able to detect a conflict between the second UE 115-b and the third UE 115-c based at least in part on received sidelink transmissions on the same resources or nearby frequencies, based on received AKC/NACKs, or the like. When a conflict is detected, the first UE 115-a may provide coordination information in the form of a conflict indication 230 to either or both of the second UE 115-b and the third UE 115-c regarding conflicts between sidelink transmissions from the second UE 115-b and the third UE 115-c.

The first UE 115-a may transmit the conflict indication 230 using different mechanisms or containers. The first UE 115-a may select which mechanism or container to use to transmit the conflict indication 230 based at least in part on payload size of the conflict indication. For example, the first UE 115-a may transmit the conflict indication in via a physical sidelink feedback channel (PSFCH), a sidelink control information (SCI) in a physical sidelink shared channel (PSSCH), a MAC-CE, a new physical channel, or RRC. In some examples, the first UE 115-a may send or reuse feedback resources for the coordination information. In examples that use SCI, the SCI may be SCI-1, SCI-2, or other type of SCI. In some cases, the conflict indication 230 may be a HARQ feedback transmission, for example, NACK in PSFCH.

In some cases, the first UE 115-a may be configured to transmit the conflict indication 230 periodically, aperiodically, semi-statically, or dynamically (e.g., via RRC, DCI, SCI, MAC-CE, etc.). In some examples, the first UE 115-a may transmit the conflict indication 230 when triggered. A trigger to transmit the conflict indication 230 may be the detection of an event, such as a detection of a conflict or upon request. The techniques described herein further provide for sequence-link or message-like based conflict indications 230. Sequence-link or message-like based conflict indications 230 means that the conflict indications 230 may be transmitted as a sequence or a message.

The first UE 115-a may broadcast or unicast the conflict indication 230. In some cases, the first UE 115-a, may determine which neighboring UEs 115 the conflict indication 230 is to be transmitted. For example, the first UE 115-a may transmit the conflict indication 230 to at least one of the UEs 115 involved in the conflict. In other examples, the first UE 115-a may transmit the conflict indication 230 to all of the UEs 115 involved in the conflict.

If a neighboring UE 115, such as the first UE 115-a, detects a potential conflict (e.g., pre-collision detection) or that a conflict has already happened (e.g., post-conflict detection) between multiple sidelink transmissions 220 and 225, the first UE 115-a may transmit an indication of the conflict (e.g., conflict indication 230) to one or more of the involved transmitting UEs 115. The first UE 115-a may determine which transmitting UE 115 to transmit the conflict indication to based on a conflict monitoring request 210, a set of parameters (e.g., packet priority, position of transmitting UEs, RSRP, etc.), which UEs 115 are involved in the conflict, or the like. As such, UEs 115-b, 115-c, or both may identify a conflict based on receiving the feedback channel message 240 including the conflict indication 230 from the first UE 115-a.

In some cases, the first UE 115-a may identify that a conflict occurred based on receiving feedback signals from one or more UEs 115. For example, the first UE 115-a may receive a NACK and an ACK in the same set of resources, when the first UE 115-a only expected to receive one sidelink feedback channel signal. In such cases, the first UE 115-a may determine that a conflict occurred. As such, the second UE 115-b or the third UE 115-c may receive the conflict indication or otherwise identify that a conflict occurred and may determine whether to transmit (e.g., pre-conflict) or re-transmit (e.g., post-conflict) the sidelink transmissions in accordance with the conflict type. In the example of FIG. 2, there is a conflict between two transmissions, one from the second UE 115-b and another from the third UE 115-c. However, in other examples, there may be a conflict between more than two transmissions.

The feedback channel message 240 may include regular feedback 235 and the conflict indication 230. The regular feedback 235 (e.g., HARQ ACK/NACKs) that the first UE 115-a may include in the feedback channel message 240 for other messages it received. A conflict indication 230 may indicate one or more of a conflict type, identifying information of the UEs 115 involved in the conflict, and the resources that were conflicted. In some examples, the conflict indication 230 may include indications for more than one conflict. However, in some examples a capacity of the feedback channel message 240 may be limited.

In some examples, the first sidelink transmission 220 may be associated with sidelink feedback channel resources (e.g., PSFCH resources) that the first UE 115-a may use to transmit a feedback channel signal associated with the first sidelink transmission 220 to the second UE 115-b. For example, the first UE 115-a may transmit, via sidelink communications link 205-a, feedback 235 including an ACK that indicates that the first UE 115-a successfully received and decoded the PSSCH or a NACK that indicates that the first UE 115-a did not successfully receive or decode the first sidelink transmission 220.

In some examples, a transmitting UE 115 may request one or more neighboring UEs 115 (e.g., receiving UEs, third-party UEs, etc.) to monitor for potential sidelink conflicts. In some examples, the requesting UE 115 may not be able to detect the conflicts itself, such as in type-1 through type-3 conflicts. For example, UE 115-b may determine to transmit a conflict monitoring request 210 to the first UE 115-a (e.g., third-party UE 115). Similarly, the third UE 115-c may determine to transmit a conflict monitoring request 210 to one or more UEs 115. For example, the second UE 115-*b* may transmit a conflict monitoring request 210 to at least the first UE 115-*a* via sidelink communications link 205-*a*. In some examples, the third UE 115-*c* may also transmit a conflict monitoring request to at least the first UE 115-*a*. In some cases, the conflict monitoring request 210 may include an indication of which feedback channel resources on which to monitor the conflict.

For example, the second UE 115-*b* may determine to transmit the conflict monitoring request 210 to one or more neighboring UEs 115, such as the first UE 115-*a*, based on a packet priority of the first sidelink transmission 220 being greater than a priority threshold. If the packet priority is greater than the threshold (e.g., based on a priority indication in first-stage SCI), then second UE 115-*b* may transmit the conflict monitoring request 210 to one or more neighboring UEs 115 to improve the reliability of this transmission.

The second UE 115-*b* and the third UE 115-*c* may determine (autonomously) which neighboring UEs 115 the conflict monitoring request 210 is to be transmitted. In some cases, the second UE 115-*b* may determine which neighboring UEs 115 the conflict monitoring request 210 is to be transmitted. The conflict monitoring request 210 may request another UE 115 to assist with providing information to the requesting UE 115 regarding conflicts.

The UEs 115 may have a limited capacity for how many simultaneous transmissions (e.g., on PSFCH) the UEs 115 can perform. For example, a UE 115 may have received and decoded multiple transmissions from multiple UEs 115. Each decoded transmission may correspond to one feedback transmission. If there are more feedback messages that the UE 115 can transmit in one transmission occasion, then the UE 115 may have to select and drop some of the regular feedback transmissions. Additionally, the UE 115 may have detected more conflicts than can be included in the feedback channel message 240 along with the regular feedback 235 in a single transmission occasion. The selection may be based on a priority when the capacity is exceeded. In some examples, the priority may be received from an SCI.

Furthermore, there may be a limitation for the decoding capacity of the UE 115. Techniques described herein provide inter-UE coordination message transmission prioritization for the regular feedback 235 and the conflict indications 230 when the UE 115 is subject to some capability limitations. There may also be a limit to how many simultaneous receptions (e.g., on PSFCH) the UE 115 may be able to perform. The feedback 235 and the conflict indications 230 may be selected based on a priority when the limit of receptions is exceeded. In some examples, the priority may be obtained from higher layers. Techniques described herein provide prioritization for selecting which feedback 235 and the conflict indications 230 to include in the feedback channel message 240.

Figure 3:
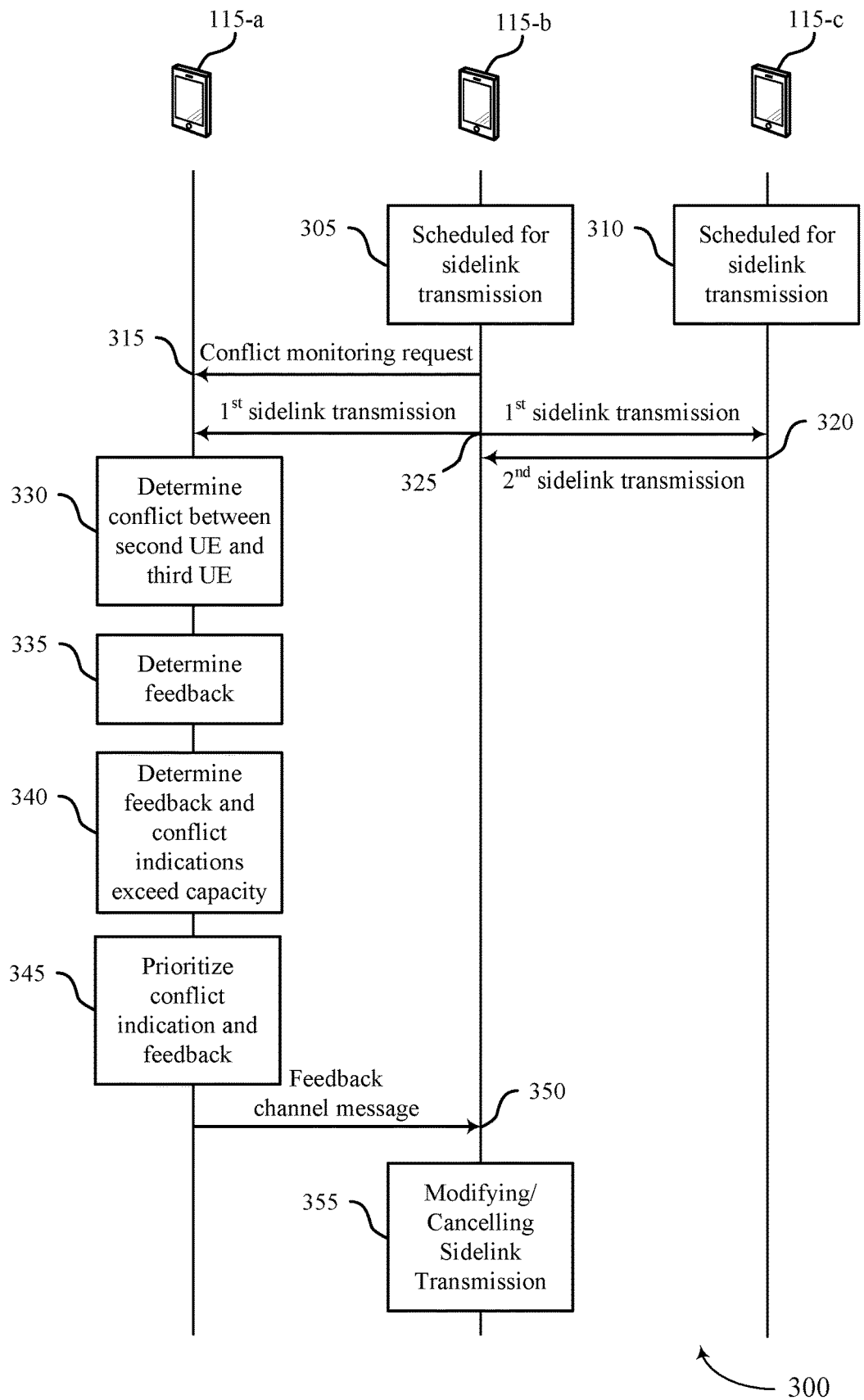
FIG. 3 illustrates an example of a process flow that supports techniques for inter-UE coordination prioritization for collision indication in accordance with various aspects of the present disclosure.

FIG. 3 illustrates an example of a process flow 300 that supports techniques for inter-UE coordination prioritization for collision indication in accordance with various aspects of the present disclosure. In some examples, the process flow 300 may implement aspects of wireless communications system 100 or wireless communications system 200. The process flow 300 may include a first UE 115-*a*, a second UE 115-*b*, and a third UE 115-*c* that may be examples of one or more aspects of the UEs 115 as described herein. The UEs 115 may implement inter-UE coordination prioritization for collision indications.

At 305, the second UE 115-*b* may be scheduled for one or more sidelink transmissions using a first set of resources at a first time. At 310, the third UE 115-*c* may be scheduled for one or more sidelink transmissions using a second set of resources at a second time. In some examples, the first set of resources may be the same as or overlap with one or more resources of the second set of resources. In some examples, the first time may be the same or at least partially overlaps with the second time. The second UE 115-*b* and the third UE 115-*c* may autonomously schedule their sidelink transmissions.

At 315, the second UE 115-*b* may send a conflict monitoring request to the first UE 115-*a*, which may act as a third-party UE to the sidelink transmissions of the second UE 115-*b* and the third UE 115-*c*. Upon receiving the conflict monitoring request, the first UE 115-*a* may begin to monitor for conflicts associated with the second UE 115-*b* based at least in part on the conflict monitoring request. In some examples, the third UE 115-*c* may send a conflict monitoring request to the first UE 115-*a*. In other examples, neither the third UE 115-*c* nor the second UE 115-*b* may send a conflict monitoring request.

The second UE 115-*b* may transmit a first sidelink message at 325. The third UE 115-*c* may transmit a second sidelink message at 320. The transmission of the first sidelink message and the second sidelink message may at least partially overlap in time. There may be a conflict between the first sidelink message and the second sidelink message, such as a direct conflict, a half-duplex conflict, or an in-band emissions conflict.

At 330, the first UE 115-*a* may detect or otherwise determine that there is a conflict between the sidelink transmissions of the second UE 115-*b* and the third UE 115-*c*. The first UE 115-*a* may determine the type of the conflict. In some examples, the first UE 115-*a* may detect more than one conflict between the second UE 115-*b* and the third UE 115-*c*. In some examples, the first UE 115-*a* may also detect a conflict between one of both of the second UE 115-*b* and the third UE 115-*c* with another UE 115. Additionally, the first UE 115-*a* may also detect conflicts between other UEs 115. There may be more than one conflict type in a given slot. In some cases, the conflict indications can just be a regular HARQ feedback transmission, for example, a NACK in PSFCH.

At 335, the first UE 115-*a* may determine feedback for transmitting in a feedback transmission occasion. The feedback may be regular HARQ feedback for one or more transmissions received at the first UE 115-*a*. Sending conflict indications for more than one conflict type may be enabled (e.g., it may be pre-configured at the first UE 115-*a*). At 340, the first UE 115-*a* may determine that the combination of the feedback and conflict indications exceeds the capacity of the transmission occasion. That is, the first UE 115-*a* may determine that it has more feedback and conflict indications than can be sent in a single transmission occasion. Because there are more regular feedback and conflict indications than space allows, some of the feedback or conflict indications may be dropped. Techniques described herein provide means for prioritizing the feedback and conflict indications to be included in the transmission occasion.

At 345, the first UE 115-*a* may prioritize conflict indications and feedback for selection to be included in the transmission occasion. When determining that a conflict indication may be transmitted and when the total number of concurrent transmissions (e.g., PSFCH) are more than allowed, the first UE 115-*a* may prioritize the conflict indication based at least on the conflict type. For example, a conflict indication for a certain conflict type may be prioritized for transmission over conflict indications for other conflict types. The first UE 115-*a* may prioritize the conflict indications and feedback based on one or more priority schemes.

In an example, the first UE 115-*a* may prioritize the conflict indications to be sent in the same transmission occasion based at least in part on a transmission priority for the different conflict types. The transmission priority may be determined at the first UE 115-*a*, may be configured, or may be pre-configured. In one example, the conflict types may be prioritized as the type-1 conflicts having the highest priority, followed by type-2 conflicts, and then followed by type-3 conflicts with the lowest priority. When the first UE 115-*a* generated multiple conflict indications with different conflict types, the first UE 115-*a* may prioritize the conflict type with higher transmission priority. That is, if the first UE 115-*a* has to drop some conflicts indication for transmission due to the limitation to the number of concurrent conflict indication transmissions, it may drop those conflict indications having lower transmission priority.

In another example, regular feedback transmissions may be prioritized over all conflict indications. For example, PSFCH transmissions may always be prioritized. If the first UE 115-*a* has remaining capacity for the transmission occasion, the first UE 115-*a* may then transmit collision indications. The first UE 115-*a* may prioritize which conflict indications to include according to other examples described herein. For example, the first UE 115-*a* may prioritize the different types of conflicts based on a configuration or pre-configuration.

In another example, some conflict types may be prioritized over regular feedback transmissions. For example, a type-1 conflict may be prioritized over regular PSFCH feedback. Any remaining conflict indication types have lower priority than regular PSFCH feedback.

Another example prioritizes some conflict types the same as regular PSFCH feedback. For example, type-1 conflicts may be prioritized the same as legacy or regular PSFCH feedback while the remaining conflict types have lower priority. In other examples, type-2 or type-3 conflicts may be prioritized the same as legacy or regular PSFCH feedback.

In some example, there may be too many conflict indications having the same priority for all of them to be included in the feedback message of the transmission occasion. In such an example, some conflict indications within the same conflict transmission priority level may have to be dropped. If the selection of conflict indications is needed (e.g., the first UE 115-*a* cannot transmit all of the conflict indication PSFCHs due to capacity limitations and needs to drop some), individual PSFCHs within the same conflict transmission priority level may be prioritized based on that PSFCH's priority. For example, individual PSFCH priority may be associated with corresponding PSCCH/PSSCH transmission. In some examples, the priority may be indicated in SCI. Similarly, when a certain priority conflict indication type is prioritized the same as regular PSFCH, all individual PSFCH within the priority transmission level (e.g., type-1 conflict indication PSFCHs and regular PSFCHs) may be prioritized based on each PSFCH's associated transmission priority level.

In another example, if conflict indications in each conflict type have the same priority level, the priority level may be pre-determined or pre-configured. The first UE 115-*a* may select conflict indications for transmission based on the priority level of each individual conflict indication. The priority level may be indicated in a corresponding SCI. In some examples, for conflict indication PSFCH, the priority value may be the pre-configured value for that conflict indication type.

In some examples, dropping some conflict indications having the same transmission priority level may be based at least in part on a random selection, a content of the transmissions that conflicted, a distance between the first UE 115-*a* and one or more of the conflicting UEs 115, a priority of one or more of the conflicting transmissions, or the like.

At 350, the first UE 115-*a* may transmit the feedback channel message, which includes all of the selected regular feedback and conflict indications. The first UE 115-*a* may transmit the feedback channel message to the second UE 115-*b*, the third UE 115-*c*, or both. The feedback channel message may be part of coordination information.

The second UE 115-*b* may receive the feedback channel message with the conflict indications. At 355, the second UE 115-*b* may take a remedying action to address the one or more conflict indications. That is, the second UE 115-*b* (or the third UE 115-*c* in other examples) may take an action to remedy the conflict or a future conflict. Such actions may include, but are not limited to, retransmitting one or more packets, selecting different resources for sidelink transmissions, coordinating sidelink transmissions with one or more UEs 115, or the like. The feedback channel message may improve resource allocation for either or both of the second UE 115-*b* and the third UE 115-*c*.

Figure 4:
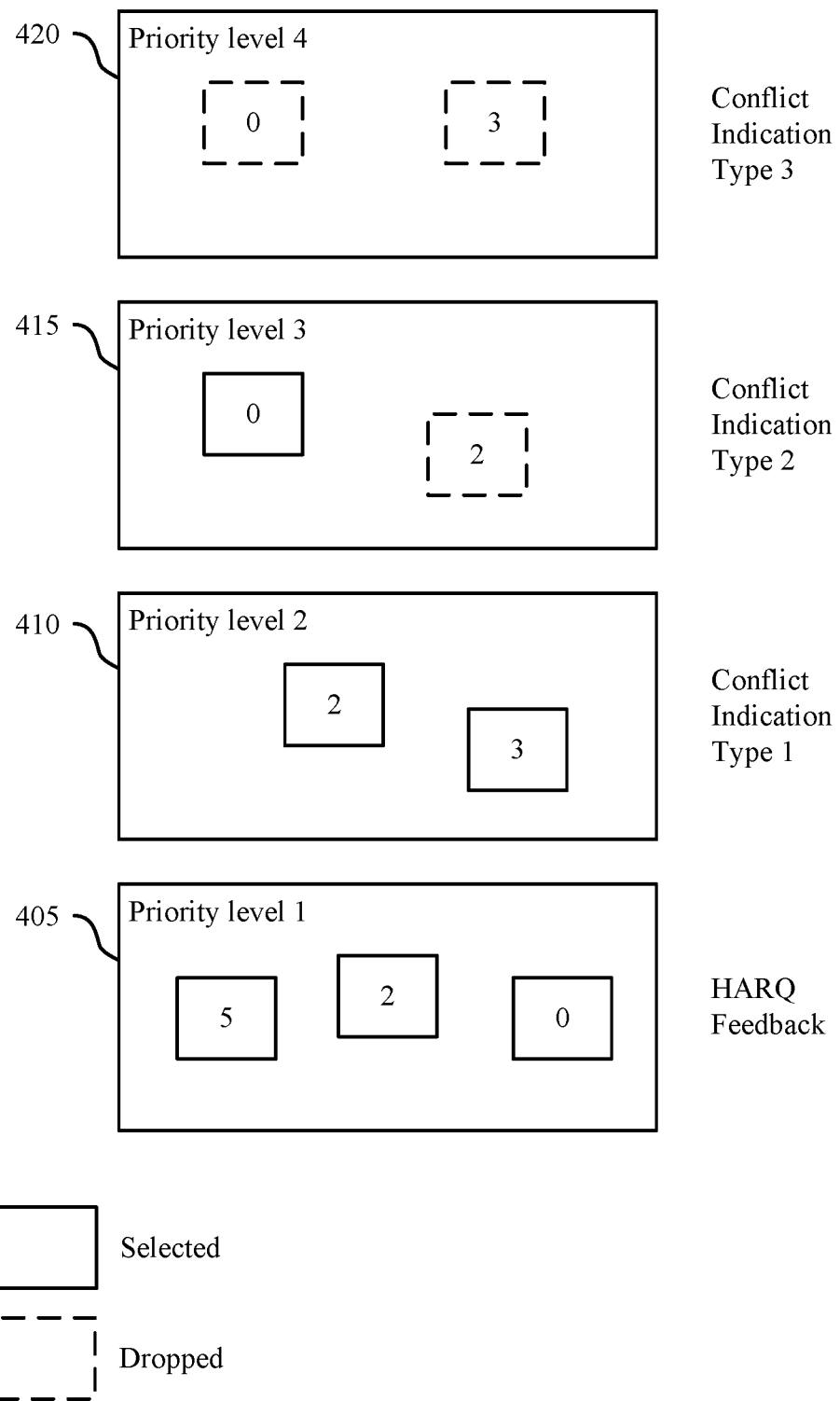
FIG. 4 illustrates an example of a block diagram that supports techniques for inter-UE coordination prioritization for collision indication in accordance with various aspects of the present disclosure.

FIG. 4 illustrates an example of a block diagram 400 that supports techniques for inter-UE coordination prioritization for collision indication in accordance with various aspects of the present disclosure. The block diagram 400 provides a conceptual example of prioritizing HARQ feedback and different conflict indication types. In this example, the UE may be able to transmit a total of six PSFCHs in one transmission occasion (e.g., one PSFCH occasion).

The block diagram 400 includes four different priority levels, box 405 for priority level 1, box 410 for priority level 2, box 415 for priority level 3, and box 420 for priority level 4. Regular HARQ feedback may be assigned priority level 1, conflict indication type-1 may be assigned priority level 2, conflict indication type-2 may be assigned priority level 3, and conflict indication type-3 may be assigned priority level 4. Those with lower priority levels may be selected for the transmission occasion first. In this example, all of the regular feedback has the highest priority, then conflict indication type-1 has the next highest priority, then conflict indication type-2 has the next priority, and finally conflict indication type-3 has the lowest priority. The feedback and conflict indications may be assigned to their priority level box. Within each box, the feedback may be prioritized. An example in FIG. 4 is provided via the numbers indicated with the feedback, with the lower number having the higher priority. These priority levels may be pre-configured.

In this example, there are three regular feedback messages, which are assigned to box 405. All of the feedback messages in box 405 are selected, because they all are regular HARQ feedback and have the highest priority. Next, the two conflict indications in box 410 are selected. This makes a total of five selected feedback messages and conflict indications, leaving space for one more conflict indication. The UE selects one conflict indication from box 415. One of the conflict indications has a priority of 0 and the other conflict indication has a priority of 2. The selected conflict indication is the one with the lower priority, 0, and the other conflict indication is dropped. Because the maximum of six feedback messages and conflict indications are selected, any other conflict indications are dropped, such as those in box 420. This is just one example priority selection, while many other examples are contemplated. Any of the priority schemes described herein may be combined.

Figure 5:
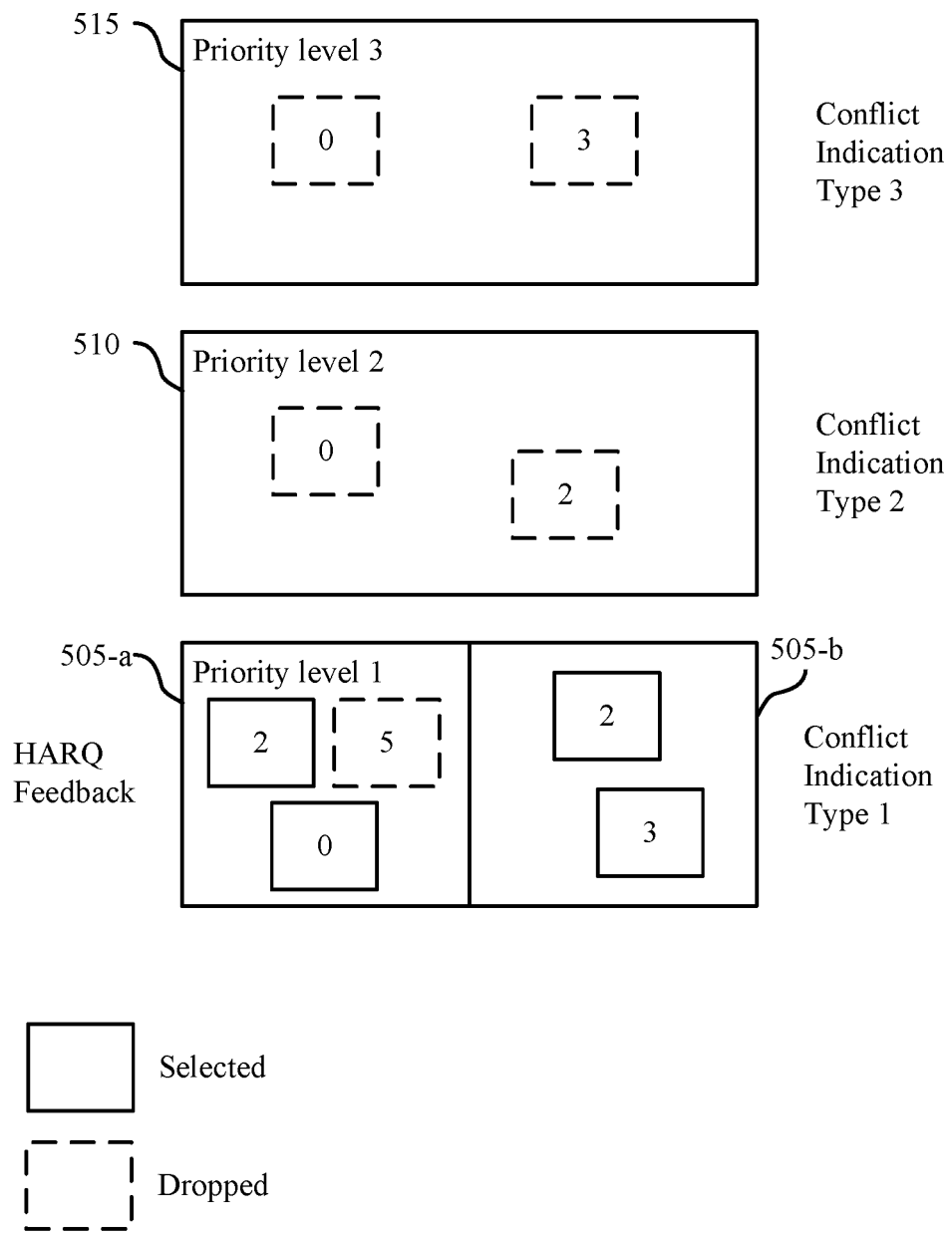
FIG. 5 illustrates an example of a block diagram that supports techniques for inter-UE coordination prioritization for collision indication in accordance with various aspects of the present disclosure.

FIG. 5 illustrates an example of a block diagram 500 that supports techniques for inter-UE coordination prioritization for collision indication in accordance with various aspects of the present disclosure. The block diagram 500 provides a conceptual example of prioritizing HARQ feedback and different conflict indication types. In this example, the UE may be able to transmit a total of four PSFCHs in one transmission occasion (e.g., one PSFCH occasion).

The block diagram 500 includes three different priority levels, box 505 for priority level 1 (split into parts 505-a and 505-b), box 510 for priority level 2, and box 520 for priority level 3. Regular HARQ feedback may be assigned priority level 1 (part 505-a) and conflict indication type-1 may also be assigned priority level 1 (part 505-b). Conflict indication type-2 may be assigned priority level 2, and conflict indication type-3 may be assigned priority level 3. Those with lower priority levels may be selected for the transmission occasion first. In this example, all of the regular feedback and conflict indication type-1 have the highest priority, then conflict indication type-2 has the next priority, and finally conflict indication type-3 has the lowest priority. The feedback and conflict indications may be assigned to their priority level box. Within each box, the feedback may be prioritized. The example in FIG. 5 indicates priority of the feedback or conflict indications via the numbers indicated, with the lower number having the higher priority. These priority levels may be pre-configured.

In this example, there are three regular feedback messages, which are assigned to part 505-a. The regular feedback has priority levels of 0, 2, and 5 (within the priority level 1). Next, two conflict indications with conflict type-1 are in part 505-b, which have priority levels 2 and 3. Because the UE can only send a maximum of four PSFCHs in one transmission occasion, only four of the feedback messages and conflict indications may be selected for inclusion. Here, the feedback message with priority level 0 is selected first. Then, the feedback with the priority level 2 is selected along with the conflict indication of priority level 2. The next conflict indication has a priority level of 3 while the next feedback message has a priority level of 5. Because only one more feedback message or conflict indication may be chosen, the conflict indication with priority level of 3 is selected because it has a higher priority than the feedback message with priority level 5. The feedback message with priority level 5 is dropped, along with all of the conflict indications in box 510 and box 515. If there are more feedback messages or conflict indications with the same priority than can be selected, they may be chosen at random or according to other criteria. This is just one example priority selection, while many other examples are contemplated. Any of the priority schemes described herein may be combined.

Figure 6:
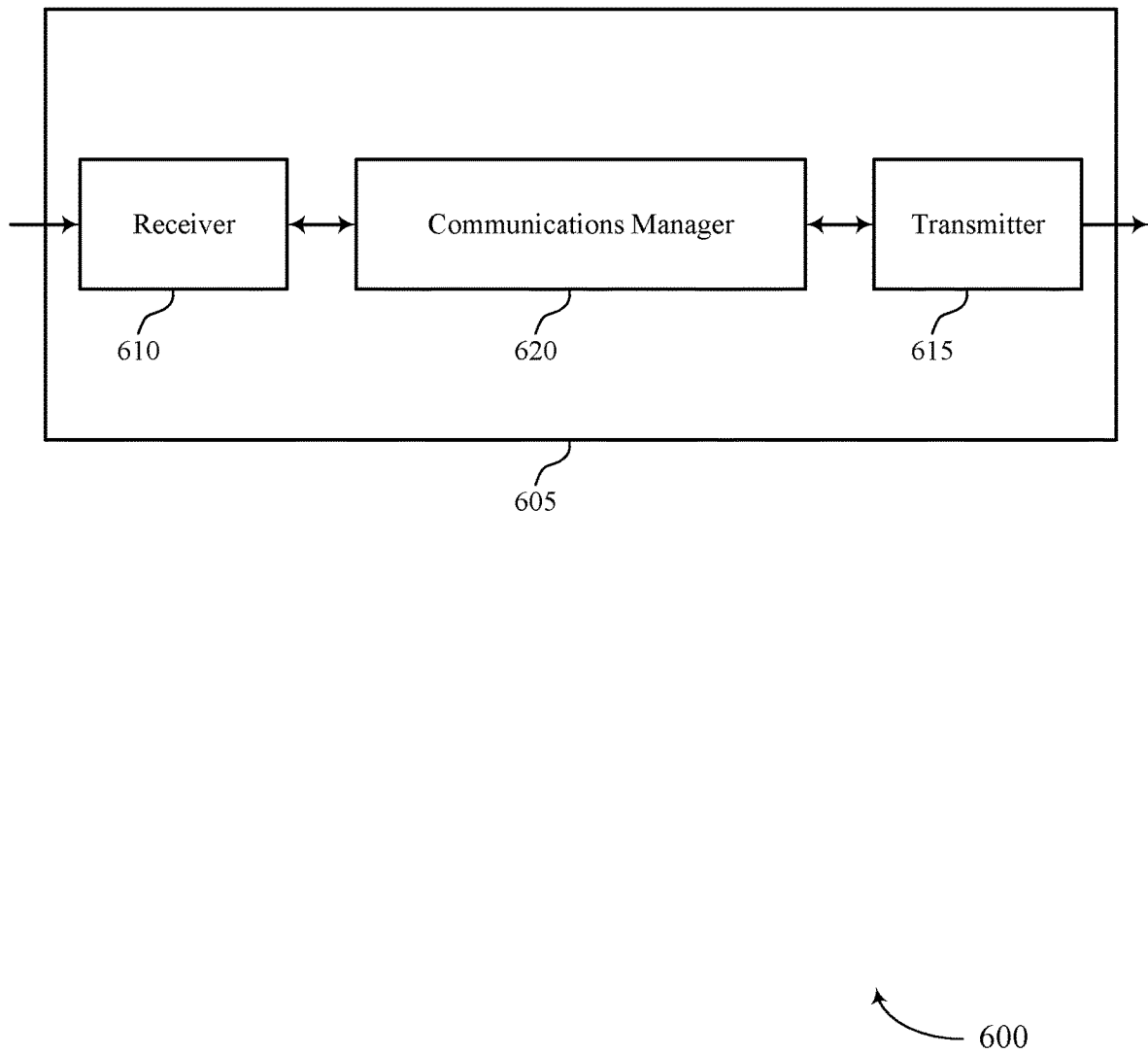
FIGS. 6 and 7 show block diagrams of devices that support techniques for inter-UE coordination prioritization for collision indication in accordance with various aspects of the present disclosure.

FIG. 6 shows a block diagram 600 of a device 605 that supports techniques for inter-UE coordination prioritization for collision indication in accordance with various aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for inter-UE coordination prioritization for collision indication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for inter-UE coordination prioritization for collision indication). In some examples, the transmitter 615 may be co-located with a receiver 610 in a transceiver. The transmitter 615 may utilize a single antenna or a set of multiple antennas.

The communications manager 620, the receiver 610, the transmitter 615, or various combinations thereof or various components thereof may be examples of means for performing various aspects of techniques for inter-UE coordination prioritization for collision indication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for receiving at least a first sidelink transmission from a second UE, where at least a second sidelink transmission from a third UE is scheduled contemporaneously with at least the first sidelink transmission from the second UE. The communications manager 620 may be configured as or otherwise support a means for transmitting an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, reduced interference, and more efficient utilization of communication resources.

Figure 7:
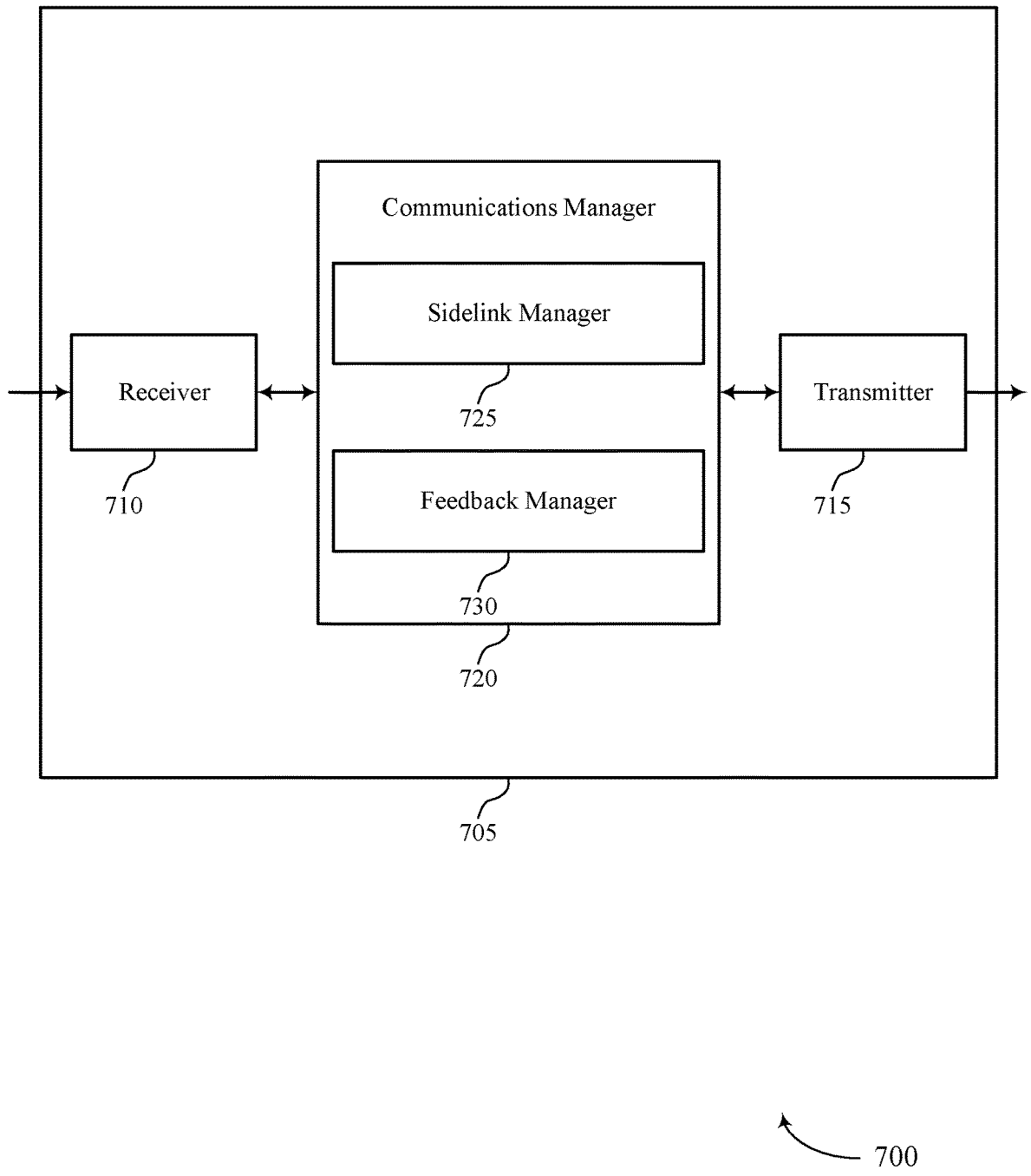

FIG. 7 shows a block diagram 700 of a device 705 that supports techniques for inter-UE coordination prioritization for collision indication in accordance with various aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for inter-UE coordination prioritization for collision indication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for inter-UE coordination prioritization for collision indication). In some examples, the transmitter 715 may be co-located with a receiver 710 in a transceiver. The transmitter 715 may utilize a single antenna or a set of multiple antennas.

The device 705, or various components thereof, may be an example of means for performing various aspects of techniques for inter-UE coordination prioritization for collision indication as described herein. For example, the communications manager 720 may include a sidelink manager 725 a feedback manager 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The sidelink manager 725 may be configured as or otherwise support a means for receiving at least a first sidelink transmission from a second UE, where at least a second sidelink transmission from a third UE is scheduled contemporaneously with at least the first sidelink transmission from the second UE. The feedback manager 730 may be configured as or otherwise support a means for transmitting an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE.

Figure 8:
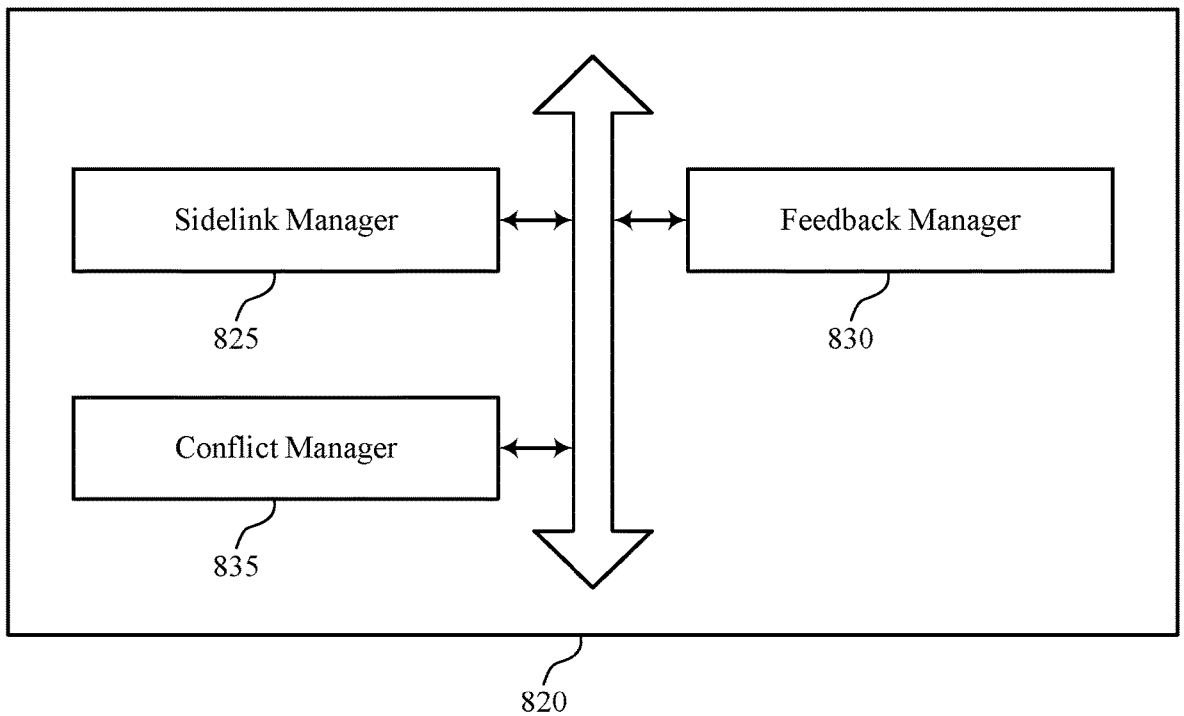
FIG. 8 shows a block diagram of a communications manager that supports techniques for inter-UE coordination prioritization for collision indication in accordance with various aspects of the present disclosure.

FIG. 8 shows a block diagram 800 of a communications manager 820 that supports techniques for inter-UE coordination prioritization for collision indication in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for inter-UE coordination prioritization for collision indication as described herein. For example, the communications manager 820 may include a sidelink manager 825, a feedback manager 830, a conflict manager 835, or any combination thereof. Each of these components may communicate, directly or indirectly, with one another (e.g., via one or more buses).

The communications manager 820 may support wireless communication at a first UE in accordance with examples as disclosed herein. The sidelink manager 825 may be configured as or otherwise support a means for receiving at least a first sidelink transmission from a second UE, where at least a second sidelink transmission from a third UE is scheduled contemporaneously with at least the first sidelink transmission from the second UE. The feedback manager 830 may be configured as or otherwise support a means for transmitting an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE.

In some examples, the conflict manager 835 may be configured as or otherwise support a means for determining a type of conflict between the second UE and the third UE, where the prioritization of the information is based on the type of conflict. In some examples, the prioritization of information prioritizes conflict indications of the type of conflict over first UE feedback messages.

In some examples, the type of conflict includes a direct collision of at least the first sidelink transmission from the second UE transmitted over a first resource with at least the second sidelink transmission from the third UE over the first resource, a half-duplex collision of at least the first sidelink transmission from the second UE transmitted in a slot with at least the second sidelink transmission from the third UE transmitted in the slot, or an in-band collision of at least the first sidelink transmission from the second UE transmitted over a first frequency with at least the second sidelink transmission from the third UE over a second frequency adjacent to the first frequency.

In some examples, the prioritization includes a first priority level for the direct collision, a second priority level lower than the first priority level for the half-duplex collision, and a third priority level lower than the second priority level to for the in-band collision. In some examples, the prioritization further includes a fourth priority level for first UE feedback messages. In some examples, the fourth priority level may be higher than the first priority level.

In some examples, the prioritization further includes the first priority level for first UE feedback messages. In some examples, the indication is a first conflict indication. In some examples, the information further includes at least one first UE feedback message and at least a second conflict indication.

In some examples, the conflict manager 835 may be configured as or otherwise support a means for detecting a set of multiple conflicts associated with the transmission occasion.

In some examples, the feedback manager 830 may be configured as or otherwise support a means for determining a set of multiple first UE feedback messages associated with the transmission occasion. In some examples, the feedback manager 830 may be configured as or otherwise support a means for determining a maximum number of feedback messages that may be sent in the transmission occasion. In some examples, the feedback manager 830 may be configured as or otherwise support a means for selecting a subset of first UE feedback messages from the set of multiple first UE feedback messages based on the prioritization. In some examples, the feedback manager 830 may be configured as or otherwise support a means for selecting a subset of a set of multiple indications for the set of multiple conflicts based on the prioritization, where transmitting the indication in the transmission occasion further includes transmitting the subset of the set of multiple indications and the subset of first UE feedback messages in the transmission occasion.

In some examples, the indication is associated with a first conflict of a first conflict type, and the conflict manager 835 may be configured as or otherwise support a means for identifying at least a second conflict of the first conflict type. In some examples, the indication is associated with a first conflict of a first conflict type, and the conflict manager 835 may be configured as or otherwise support a means for selecting the first conflict over at least the second conflict to indicate in the indication based on a data transmission prioritization.

In some examples, the indication is associated with a first conflict of a first conflict type, and the conflict manager 835 may be configured as or otherwise support a means for identifying at least a second conflict of the first conflict type. In some examples, the indication is associated with a first conflict of a first conflict type, and the conflict manager 835 may be configured as or otherwise support a means for selecting the first conflict over at least the second conflict to indicate in the indication based on a ranking of the first conflict and at least the second conflict.

In some examples, the sidelink manager 825 may be configured as or otherwise support a means for receiving the second sidelink transmission from the third UE via the first resource, where the indication is based on receiving the first sidelink transmission and the second sidelink transmission. In some examples, the first sidelink transmission is received via a first resource. In some examples, the second sidelink transmission is scheduled for transmission with the first resource.

Figure 9:
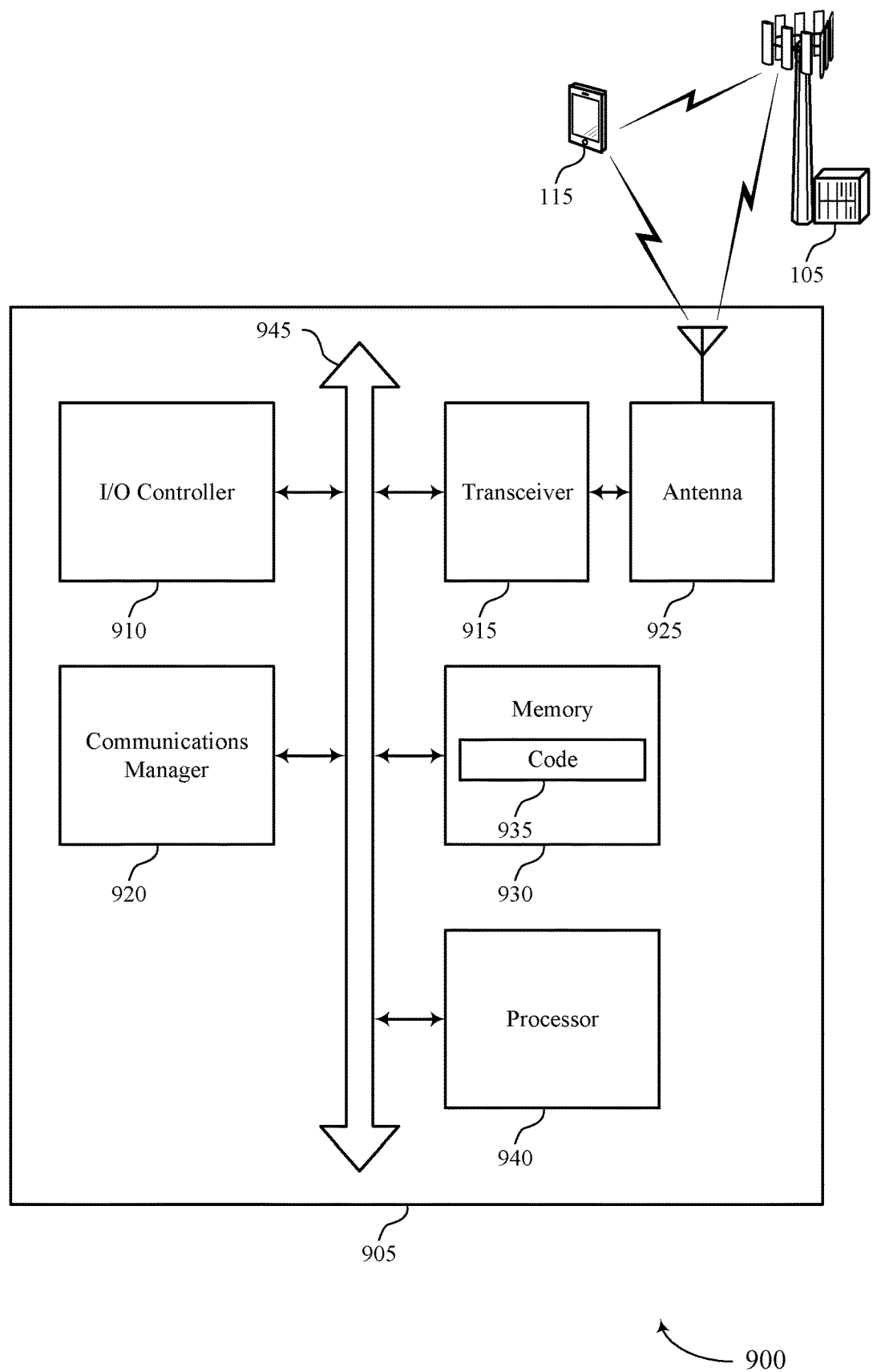
FIG. 9 shows a diagram of a system including a device that supports techniques for inter-UE coordination prioritization for collision indication in accordance with various aspects of the present disclosure.

FIG. 9 shows a diagram of a system 900 including a device 905 that supports techniques for inter-UE coordination prioritization for collision indication in accordance with various aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for inter-UE coordination prioritization for collision indication). For example, the device 905 or a component of the device 905 may include a processor 940 and memory 930 coupled to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving at least a first sidelink transmission from a second UE, where at least a second sidelink transmission from a third UE is scheduled contemporaneously with at least the first sidelink transmission from the second UE. The communications manager 920 may be configured as or otherwise support a means for transmitting an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE.

By including or configuring the communications manager 920 in accordance with examples as described herein, the device 905 may support techniques for improved communication reliability, reduced latency, improved user experience related to reduced processing and interference, reduced power consumption, more efficient utilization of communication resources, improved coordination between devices, and longer battery life.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for inter-UE coordination prioritization for collision indication as described herein, or the processor 940 and the memory 930 may be otherwise configured to perform or support such operations.

Figure 10:
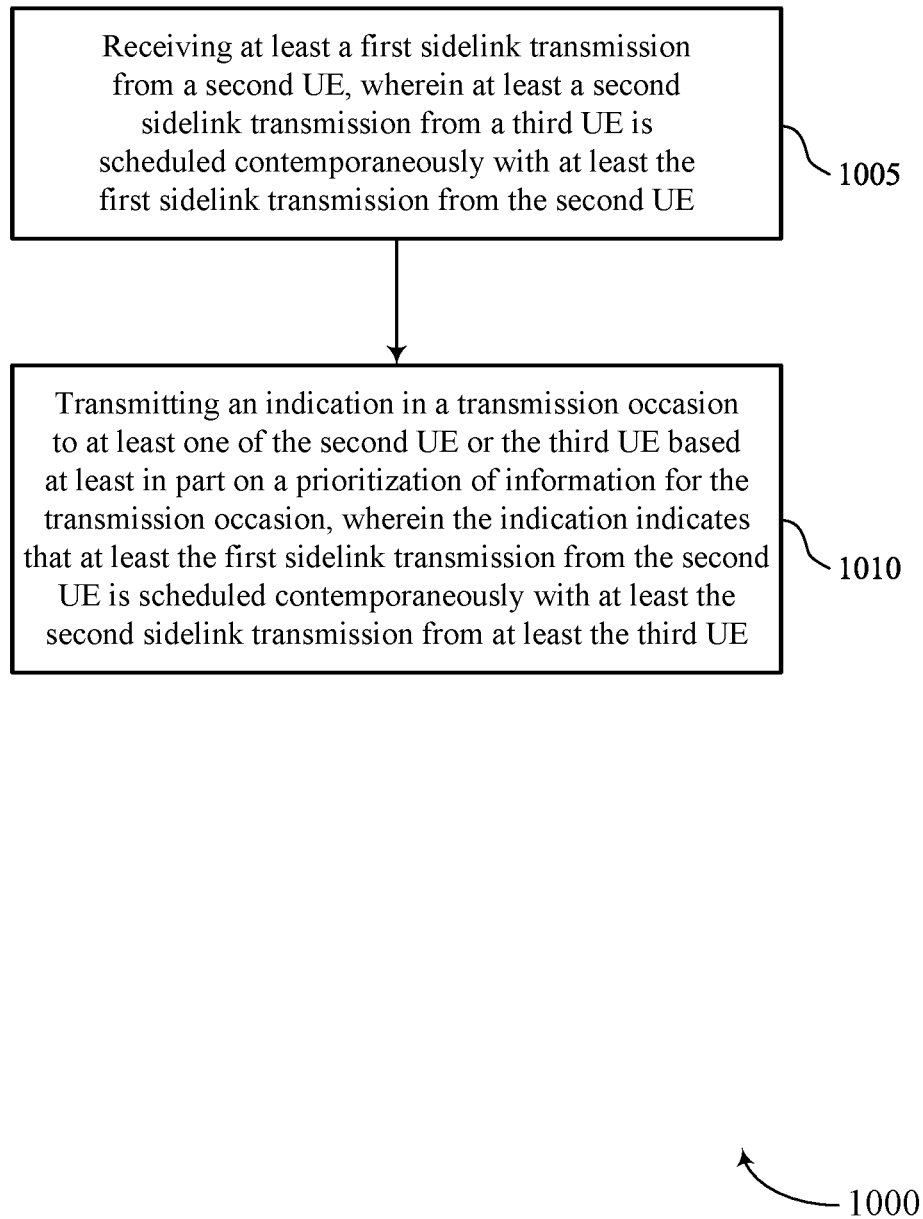
FIGS. 10 through 12 show flowcharts illustrating methods that support techniques for inter-UE coordination prioritization for collision indication in accordance with various aspects of the present disclosure.

FIG. 10 shows a flowchart illustrating a method 1000 that supports techniques for inter-UE coordination prioritization for collision indication in accordance with various aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving at least a first sidelink transmission from a second UE, where at least a second sidelink transmission from a third UE is scheduled contemporaneously with at least the first sidelink transmission from the second UE. The operations of 1005 may be performed in accordance with examples as disclosed herein. In some examples, aspects of the operations of 1005 may be performed by a sidelink manager 825 as described with reference to FIG. 8.

At 1010, the method may include transmitting an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE. The operations of 1010 may be performed in accordance with examples as disclosed herein. In some examples, aspects of the operations of 1010 may be performed by a feedback manager 830 as described with reference to FIG. 8.

Figure 11:
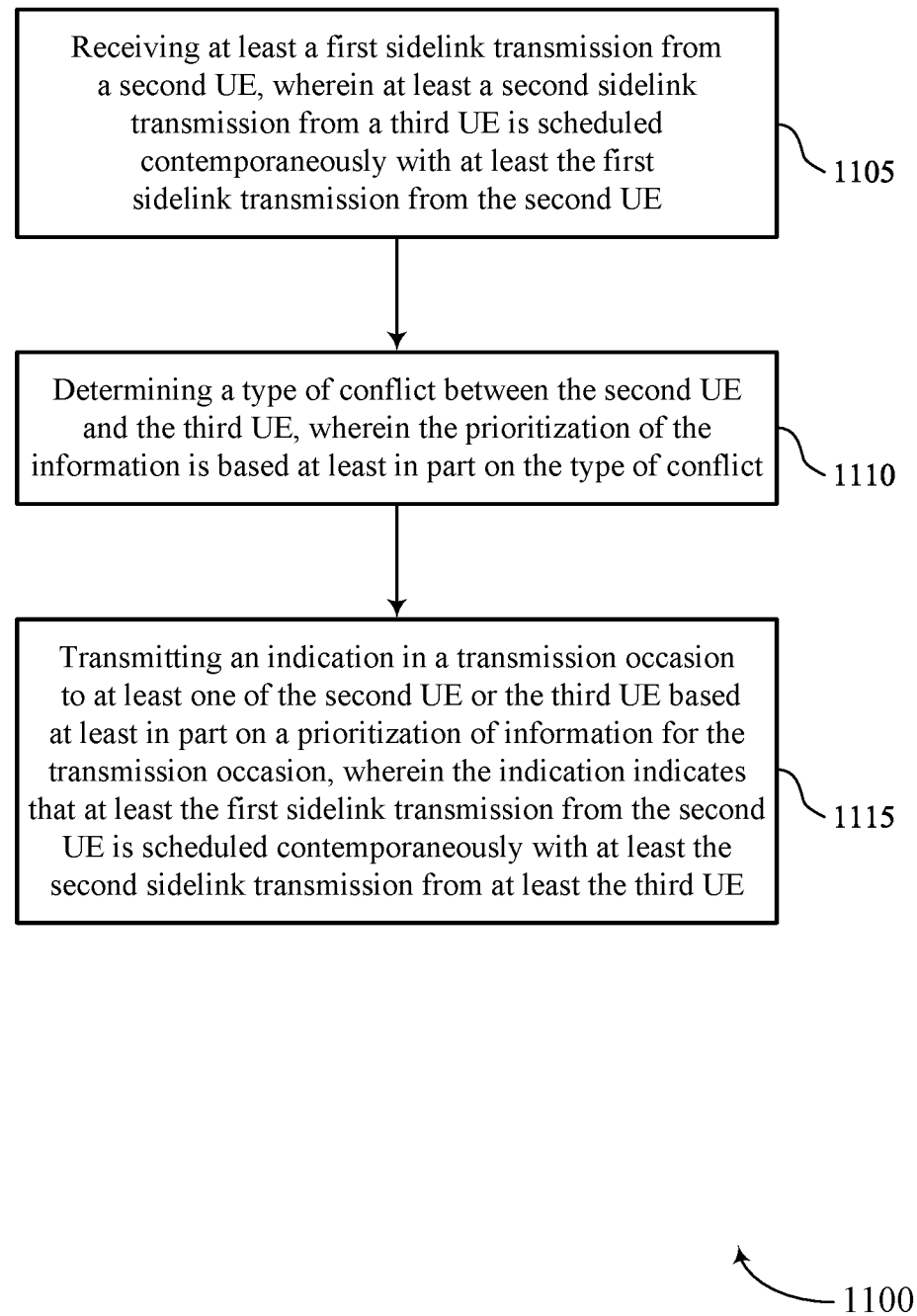

FIG. 11 shows a flowchart illustrating a method 1100 that supports techniques for inter-UE coordination prioritization for collision indication in accordance with various aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving at least a first sidelink transmission from a second UE, where at least a second sidelink transmission from a third UE is scheduled contemporaneously with at least the first sidelink transmission from the second UE. The operations of 1105 may be performed in accordance with examples as disclosed herein. In some examples, aspects of the operations of 1105 may be performed by a sidelink manager 825 as described with reference to FIG. 8.

At 1110, the method may include determining a type of conflict between the second UE and the third UE, where the prioritization of the information is based on the type of conflict. The operations of 1110 may be performed in accordance with examples as disclosed herein. In some examples, aspects of the operations of 1110 may be performed by a feedback manager 830 as described with reference to FIG. 8.

At 1115, the method may include transmitting an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE. The operations of 1115 may be performed in accordance with examples as disclosed herein. In some examples, aspects of the operations of 1115 may be performed by a conflict manager 835 as described with reference to FIG. 8.

Figure 12:
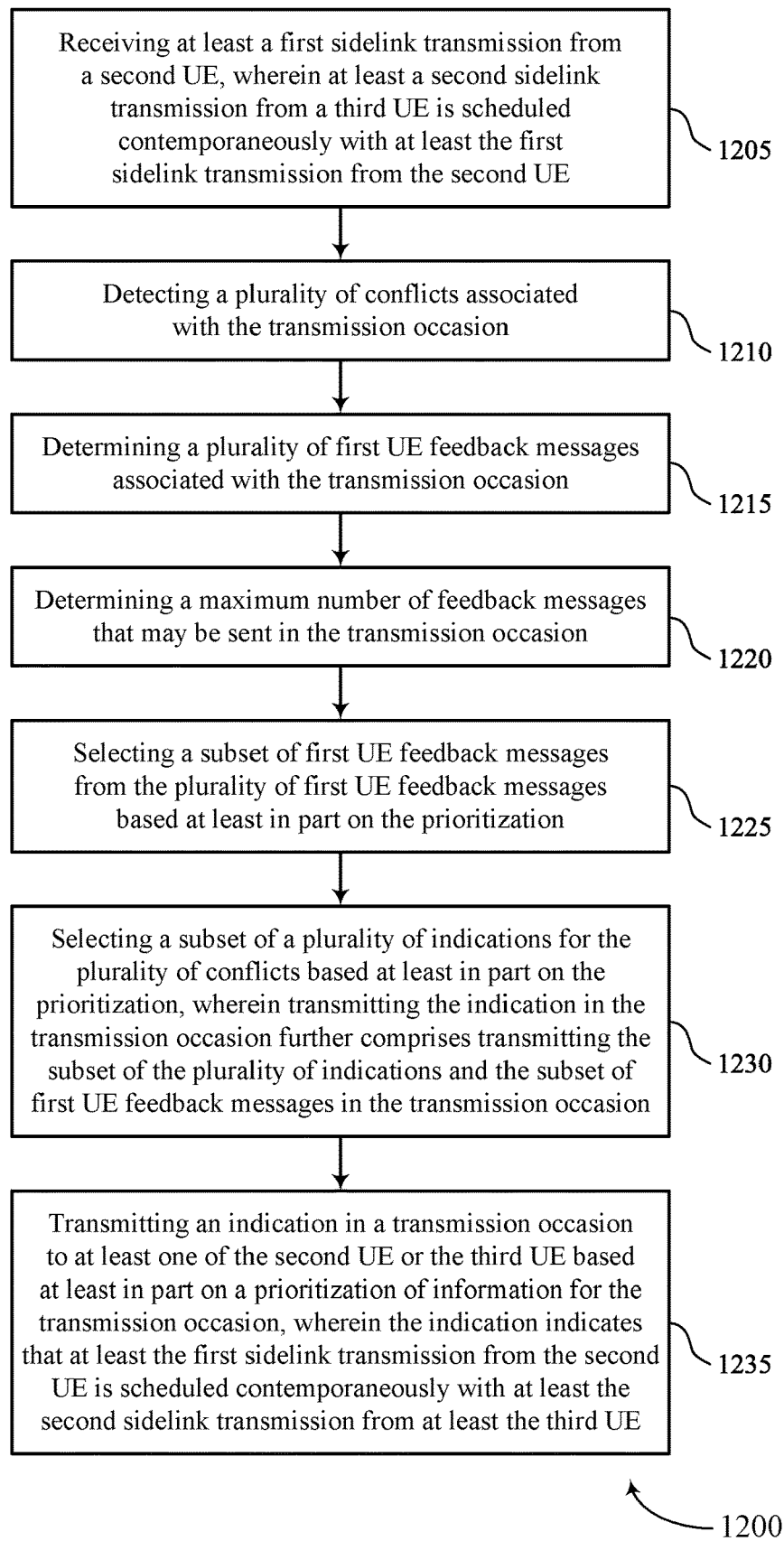

FIG. 12 shows a flowchart illustrating a method 1200 that supports techniques for inter-UE coordination prioritization for collision indication in accordance with various aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving at least a first sidelink transmission from a second UE, where at least a second sidelink transmission from a third UE is scheduled contemporaneously with at least the first sidelink transmission from the second UE. The operations of 1205 may be performed in accordance with examples as disclosed herein. In some examples, aspects of the operations of 1205 may be performed by a sidelink manager 825 as described with reference to FIG. 8.

At 1210, the method may include detecting a set of multiple conflicts associated with the transmission occasion. The operations of 1210 may be performed in accordance with examples as disclosed herein. In some examples, aspects of the operations of 1210 may be performed by a conflict manager 835 as described with reference to FIG. 8.

At 1215, the method may include determining a set of multiple first UE feedback messages associated with the transmission occasion. The operations of 1215 may be performed in accordance with examples as disclosed herein. In some examples, aspects of the operations of 1215 may be performed by a feedback manager 830 as described with reference to FIG. 8.

At 1220, the method may include determining a maximum number of feedback messages that may be sent in the transmission occasion. The operations of 1220 may be performed in accordance with examples as disclosed herein. In some examples, aspects of the operations of 1220 may be performed by a feedback manager 830 as described with reference to FIG. 8.

At 1225, the method may include selecting a subset of first UE feedback messages from the set of multiple first UE feedback messages based on the prioritization. The operations of 1225 may be performed in accordance with examples as disclosed herein. In some examples, aspects of the operations of 1225 may be performed by a feedback manager 830 as described with reference to FIG. 8.

At 1230, the method may include selecting a subset of a set of multiple indications for the set of multiple conflicts based on the prioritization, where transmitting the indication in the transmission occasion further includes transmitting the subset of the set of multiple indications and the subset of first UE feedback messages in the transmission occasion. The operations of 1230 may be performed in accordance with examples as disclosed herein. In some examples, aspects of the operations of 1230 may be performed by a feedback manager 830 as described with reference to FIG. 8.

At 1235, the method may include transmitting an indication in a transmission occasion to at least one of the second UE or the third UE based on a prioritization of information for the transmission occasion, where the indication indicates that at least the first sidelink transmission from the second UE is scheduled contemporaneously with at least the second sidelink transmission from at least the third UE. The operations of 1235 may be performed in accordance with examples as disclosed herein. In some examples, aspects of the operations of 1235 may be performed by a feedback manager 830 as described with reference to FIG. 8.

The following provides an overview of aspects of the present disclosure:

Aspect 1: A method for wireless communication at a first UE, comprising: receiving at least a first sidelink transmission from a second UE, wherein at least a second sidelink transmission from a third UE is scheduled contemporaneously with at least the first sidelink transmission from the second UE; and transmitting an indication in a transmission occasion to at least one of the second UE or the third UE based at least in part on a prioritization of information for the transmission occasion, wherein the indication indicates that at least the first sidelink transmission from the second UE is scheduled contemporaneously with at least the second sidelink transmission from at least the third UE.

Aspect 2: The method of aspect 1, further comprising: determining a type of conflict between the second UE and the third UE, wherein the prioritization of the information is based at least in part on the type of conflict.

Aspect 3: The method of aspect 2, wherein the prioritization of information prioritizes conflict indications of the type of conflict over first UE feedback messages.

Aspect 4: The method of any of aspects 2 through 3, wherein the type of conflict comprises a direct collision of at least the first sidelink transmission from the second UE transmitted over a first resource with at least the second sidelink transmission from the third UE over the first resource, a half-duplex collision of at least the first sidelink transmission from the second UE transmitted in a slot with at least the second sidelink transmission from the third UE transmitted in the slot, or an in-band collision of at least the first sidelink transmission from the second UE transmitted over a first frequency with at least the second sidelink transmission from the third UE over a second frequency adjacent to the first frequency.

Aspect 5: The method of aspect 4, wherein the prioritization comprises a first priority level for the direct collision, a second priority level lower than the first priority level for the half-duplex collision, and a third priority level lower than the second priority level to for the in-band collision.

Aspect 6: The method of aspect 5, wherein the prioritization further comprising a fourth priority level for first UE feedback messages, the fourth priority level is higher than the first priority level.

Aspect 7: The method of any of aspects 5 through 6, wherein the prioritization further comprising the first priority level for first UE feedback messages.

Aspect 8: The method of any of aspects 1 through 7, wherein the indication is a first conflict indication, and the information further comprises at least one first UE feedback message and at least a second conflict indication.

Aspect 9: The method of any of aspects 1 through 8, further comprising: detecting a plurality of conflicts associated with the transmission occasion; determining a plurality of first UE feedback messages associated with the transmission occasion; determining a maximum number of feedback messages that may be sent in the transmission occasion; selecting a subset of first UE feedback messages from the plurality of first UE feedback messages based at least in part on the prioritization; and selecting a subset of a plurality of indications for the plurality of conflicts based at least in part on the prioritization, wherein transmitting the indication in the transmission occasion further comprises transmitting the subset of the plurality of indications and the subset of first UE feedback messages in the transmission occasion.

Aspect 10: The method of any of aspects 1 through 9, wherein the indication is associated with a first conflict of a first conflict type, the method further comprising: identifying at least a second conflict of the first conflict type; and selecting the first conflict over at least the second conflict to indicate in the indication based at least in part on a data transmission prioritization.

Aspect 11: The method of any of aspects 1 through 10, wherein the indication is associated with a first conflict of a first conflict type, the method further comprising: identifying at least a second conflict of the first conflict type; and selecting the first conflict over at least the second conflict to indicate in the indication based at least in part on a ranking of the first conflict and at least the second conflict.

Aspect 12: The method of any of aspects 1 through 11, wherein the first sidelink transmission is received via a first resource, and the second sidelink transmission is scheduled for transmission with the first resource.

Aspect 13: The method of aspect 12, further comprising: receiving the second sidelink transmission from the third UE via the first resource, wherein the indication is based at least in part on receiving the first sidelink transmission and the second sidelink transmission.

Aspect 14: An apparatus for wireless communication at a first UE, comprising a processor; memory coupled with the processor; and instructions stored in the memory and executable by the processor to cause the apparatus to perform a method of any of aspects 1 through 13.

Aspect 15: An apparatus for wireless communication at a first UE, comprising at least one means for performing a method of any of aspects 1 through 13.

Aspect 16: A non-transitory computer-readable medium storing code for wireless communication at a first UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
   a processor;
   memory coupled with the processor; and
   instructions stored in the memory and executable by the processor to cause the apparatus to:
      determine that at least a first sidelink transmission from a second UE is scheduled contemporaneously with at least a second sidelink transmission from a third UE;
      determine a priority value of a feedback channel associated with conflict information; and
      transmit of the conflict information in a transmission occasion to at least one of the second UE or the third UE based at least in part on the priority value of the feedback channel, wherein the conflict information indicates that at least the first sidelink transmission from the second UE is scheduled contemporaneously with at least the second sidelink transmission from at least the third UE.

2. The apparatus of claim 1, wherein the conflict information is further associated with feedback information.

3. The apparatus of claim 1, wherein first UE feedback messages are associated with a first priority level and the conflict information is associated with a second priority level, wherein the first priority level has a higher priority than the second priority level.

4. The apparatus of claim 1, wherein the instructions stored in the memory and executable by the processor further cause the apparatus to:
   prioritize feedback information based at least in part on a priority value for the feedback information,
   wherein the transmission of the conflict information is further based at least in part on the prioritizing of the feedback information.

5. The apparatus of claim 1, wherein the instructions are further executable by the processor to cause the apparatus to:
   determine a type of conflict between the second UE and the third UE, wherein the instructions to transmit the conflict information is based at least in part on the type of conflict.

6. The apparatus of claim 5, wherein:
   the instructions to transmit the conflict information is further based on prioritizing conflict information of the type of conflict over first UE feedback messages.

7. The apparatus of claim 5, wherein the type of conflict comprises a direct collision of at least the first sidelink transmission from the second UE transmitted over a first resource with at least the second sidelink transmission from the third UE over the first resource, a half-duplex collision of at least the first sidelink transmission from the second UE transmitted in a slot with at least the second sidelink transmission from the third UE transmitted in the slot, or an in-band collision of at least the first sidelink transmission from the second UE transmitted over a first frequency with at least the second sidelink transmission from the third UE over a second frequency adjacent to the first frequency.

8. The apparatus of claim 7, wherein a second priority level is associated with the direct collision, a third priority level lower than the second priority level is associated with the half-duplex collision, and a fourth priority level lower than the third priority level is associated with the in-band collision.

9. The apparatus of claim 8, wherein
   a first priority level for first UE feedback messages is higher than the second priority level.

10. The apparatus of claim 1, wherein:
    the conflict information further comprises at least one first UE feedback message and at least a first conflict indication and a second conflict indication.

11. The apparatus of claim 1, wherein the instructions are further executable by the processor to cause the apparatus to:
    detect a plurality of conflicts associated with the transmission occasion;
    determine a plurality of first UE feedback messages associated with the transmission occasion;
    determine a maximum number of feedback messages that may be sent in the transmission occasion;
    select a subset of first UE feedback messages from the plurality of first UE feedback messages based at least in part on the priority value of the feedback channel; and
    select a subset of a plurality of indications for the plurality of conflicts based at least in part on the priority value of the feedback channel, wherein transmitting the conflict information in the transmission occasion further comprises transmitting the subset of the plurality of indications and the subset of first UE feedback messages in the transmission occasion.

12. The apparatus of claim 1, wherein the conflict information is associated with a first conflict of a first conflict type, and the instructions are further executable by the processor to cause the apparatus to:
    identify at least a second conflict of the first conflict type; and select the first conflict over at least the second conflict to indicate in the conflict information based at least in part on a data transmission prioritization.

13. The apparatus of claim 1, wherein the conflict information is associated with a first conflict of a first conflict type, and the instructions are further executable by the processor to cause the apparatus to:
identify at least a second conflict of the first conflict type; and
select the first conflict over at least the second conflict to indicate in the conflict information based at least in part on a ranking of the first conflict and at least the second conflict.

14. The apparatus of claim 1, wherein:
the first sidelink transmission is received via a first resource, and
the second sidelink transmission is scheduled for transmission with the first resource.

15. The apparatus of claim 14, wherein the instructions are further executable by the processor to cause the apparatus to:
receive the second sidelink transmission from the third UE via the first resource, wherein the conflict information is based at least in part on receiving the first sidelink transmission and the second sidelink transmission.

16. The apparatus of claim 1, wherein the conflict information indicates a pre-collision detection or a post-conflict detection.

17. A method for wireless communication at a first user equipment (UE), comprising:
determining that at least a first sidelink transmission from a second UE is scheduled contemporaneously with at least a second sidelink transmission from a third UE;
determining a priority value of a feedback channel associated with conflict information; and transmitting the conflict information in a transmission occasion to at least one of the second UE or the third UE based at least in part on the priority value of the feedback channel, wherein the conflict information indicates that at least the first sidelink transmission from the second UE is scheduled contemporaneously with at least the second sidelink transmission from at least the third UE.

18. The method of claim 17, wherein the conflict information is further associated with feedback information.

19. The method of claim 17, wherein first UE feedback messages are associated with a first priority level and the conflict information is associated with a second priority level, wherein the first priority level has a higher priority than the second priority level.

20. The method of claim 17, further comprising:
prioritizing feedback information based at least in part on a priority value for the feedback information,
wherein the transmission of the conflict information is based at least in part on the prioritizing of the feedback information and the conflict information.

21. The method of claim 17, further comprising:
determining a type of conflict between the second UE and the third UE, wherein transmitting the conflict information is based at least in part on the type of conflict.

22. The method of claim 21, wherein the type of conflict comprises a direct collision of at least the first sidelink transmission from the second UE transmitted over a first resource with at least the second sidelink transmission from the third UE over the first resource, a half-duplex collision of at least the first sidelink transmission from the second UE transmitted in a slot with at least the second sidelink transmission from the third UE transmitted in the slot, or an in-band collision of at least the first sidelink transmission from the second UE transmitted over a first frequency with at least the second sidelink transmission from the third UE over a second frequency adjacent to the first frequency.

23. The method of claim 17, wherein:
the conflict information further comprises at least one first UE feedback message and at least a first conflict indication and a second conflict indication.

24. The method of claim 17, further comprising:
detecting a plurality of conflicts associated with the transmission occasion;
determining a plurality of first UE feedback messages associated with the transmission occasion;
determining a maximum number of feedback messages that may be sent in the transmission occasion;
selecting a subset of first UE feedback messages from the plurality of first UE feedback messages based at least in part on the priority value of the feedback channel; and
selecting a subset of a plurality of indications for the plurality of conflicts based at least in part on the priority value of the feedback channel, wherein transmitting the conflict information in the transmission occasion further comprises transmitting the subset of the plurality of indications and the subset of first UE feedback messages in the transmission occasion.

25. The method of claim 17, wherein the conflict information is associated with a first conflict of a first conflict type, the method further comprising:
identifying at least a second conflict of the first conflict type; and
selecting the first conflict over at least the second conflict to indicate in the conflict information based at least in part on a data transmission prioritization.

26. The method of claim 17, wherein the conflict information is associated with a first conflict of a first conflict type, the method further comprising:
identifying at least a second conflict of the first conflict type; and
selecting the first conflict over at least the second conflict to indicate in the conflict information based at least in part on a ranking of the first conflict and at least the second conflict.

27. An apparatus for wireless communication at a first user equipment (UE), comprising:
means for determining that at least a first sidelink transmission from a second UE is scheduled contemporaneously with at least a second sidelink transmission from a third UE;
means for determining a priority value of a feedback channel associated with conflict information; and
means for transmitting the conflict information in a transmission occasion to at least one of the second UE or the third UE based at least in part on the priority value of the feedback channel, wherein the conflict information indicates that at least the first sidelink transmission from the second UE is scheduled contemporaneously with at least the second sidelink transmission from at least the third UE.

28. The apparatus of claim 27, further comprising:
means for prioritizing feedback information based at least in part on a priority value for the feedback information,
wherein the transmission of the conflict information is further based at least in part on the prioritizing of the feedback information.

29. A non-transitory computer-readable medium storing code for wireless communication at a first user equipment (UE), the code comprising instructions executable by a processor to:
- determine that at least a first sidelink transmission from a second UE is scheduled contemporaneously with at least a second sidelink transmission from a third UE;
- determine a priority value of a feedback channel associated with conflict information: and transmit the conflict information in a transmission occasion to at least one of the second UE or the third UE based at least in part on the priority value of the feedback channel, wherein the conflict information indicates that at least the first sidelink transmission from the second UE is scheduled contemporaneously with at least the second sidelink transmission from at least the third UE.

* * * * *